May 15, 1945.  F. D. PALMER  2,376,003
PACKAGING APPARATUS
Filed March 22, 1940  14 Sheets-Sheet 10
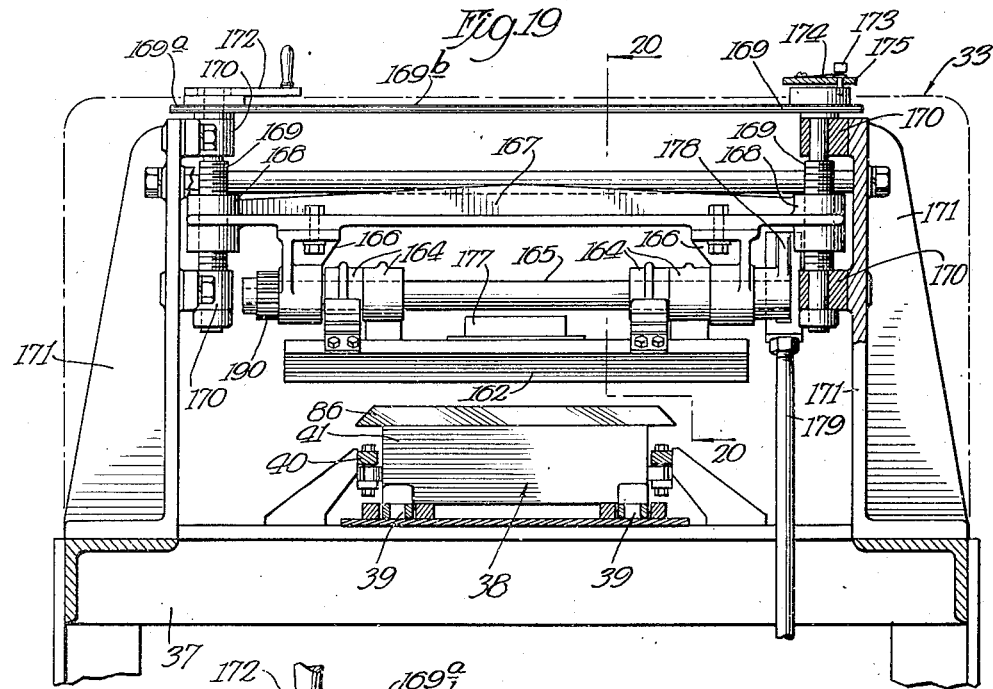
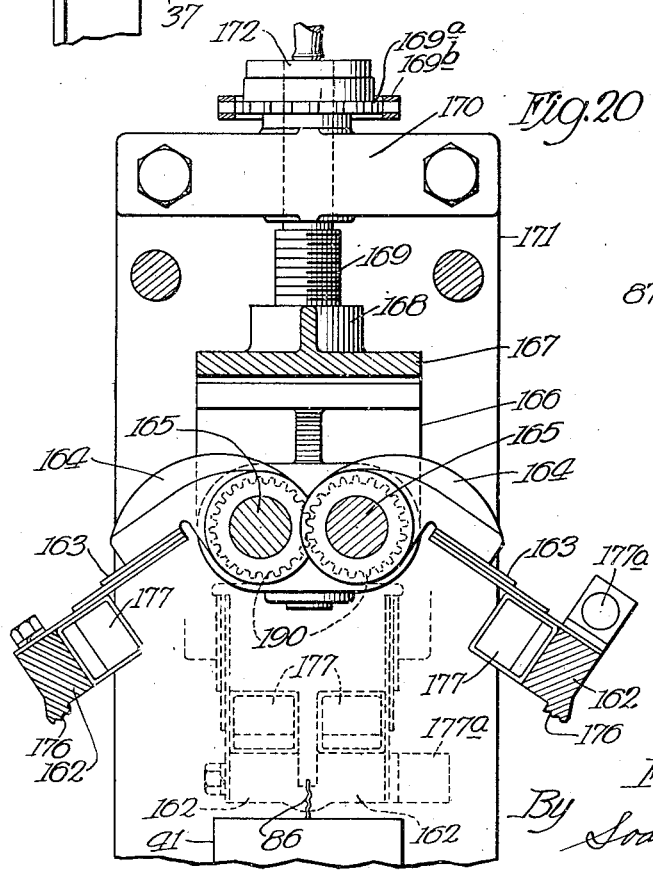
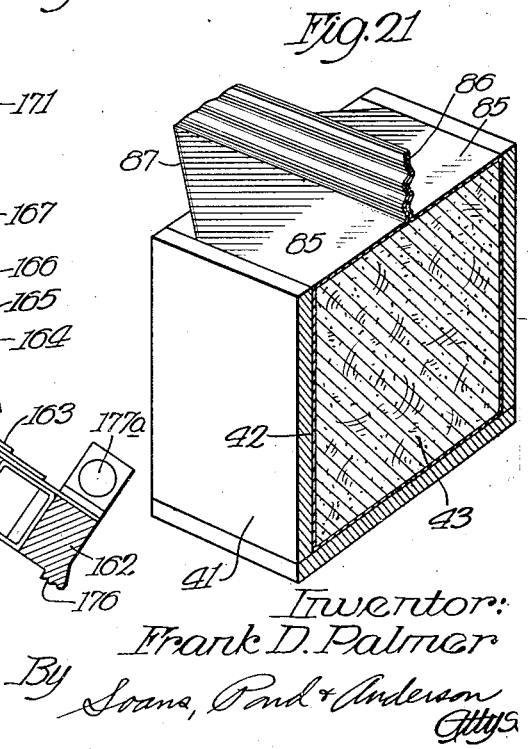
Inventor:
Frank D. Palmer
By Soans, Pond & Anderson
Attys May 15, 1945.  F. D. PALMER  2,376,003
PACKAGING APPARATUS
Filed March 22, 1940  14 Sheets-Sheet 11
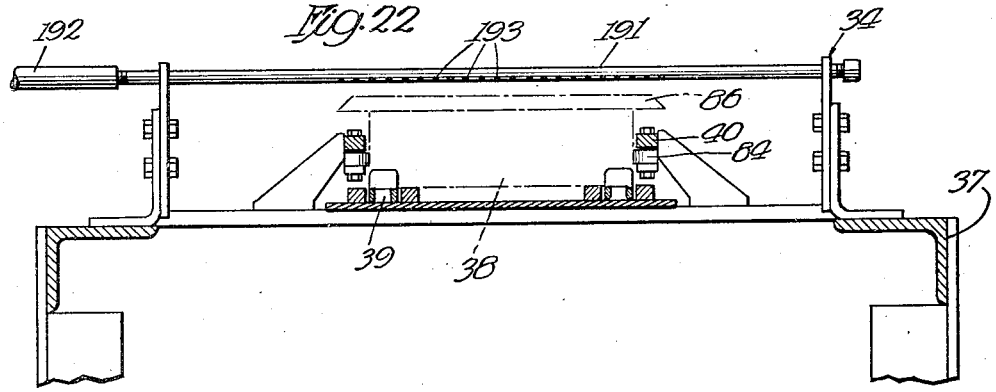
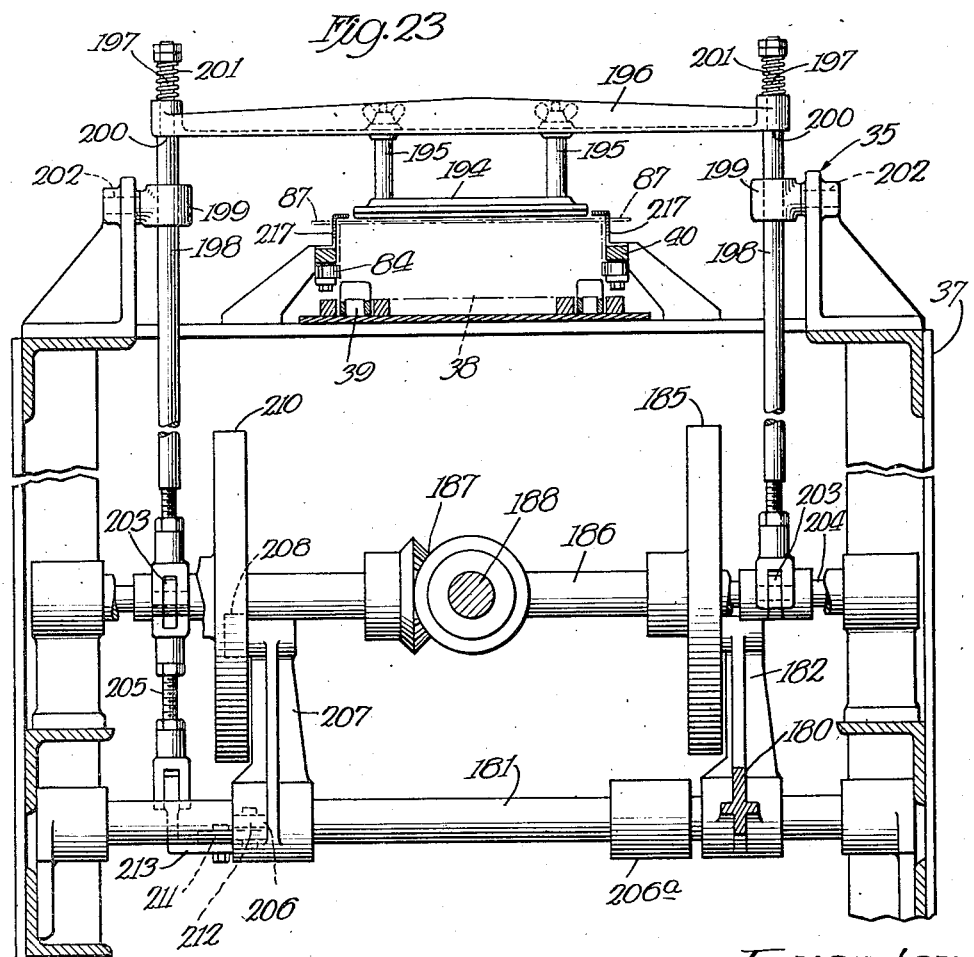
Inventor:
Frank D. Palmer
By Soans, Pond & Anderson
Attys.

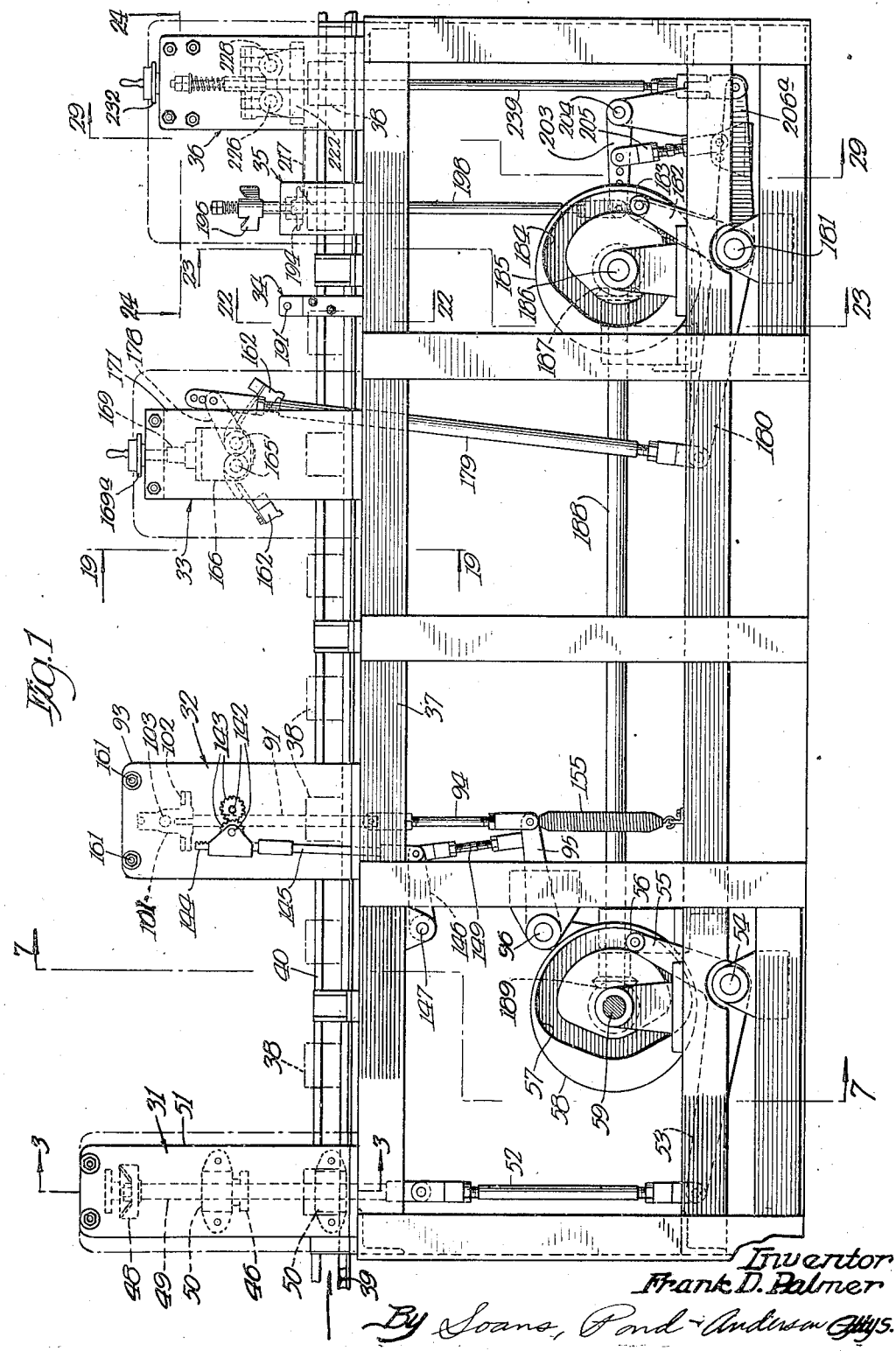

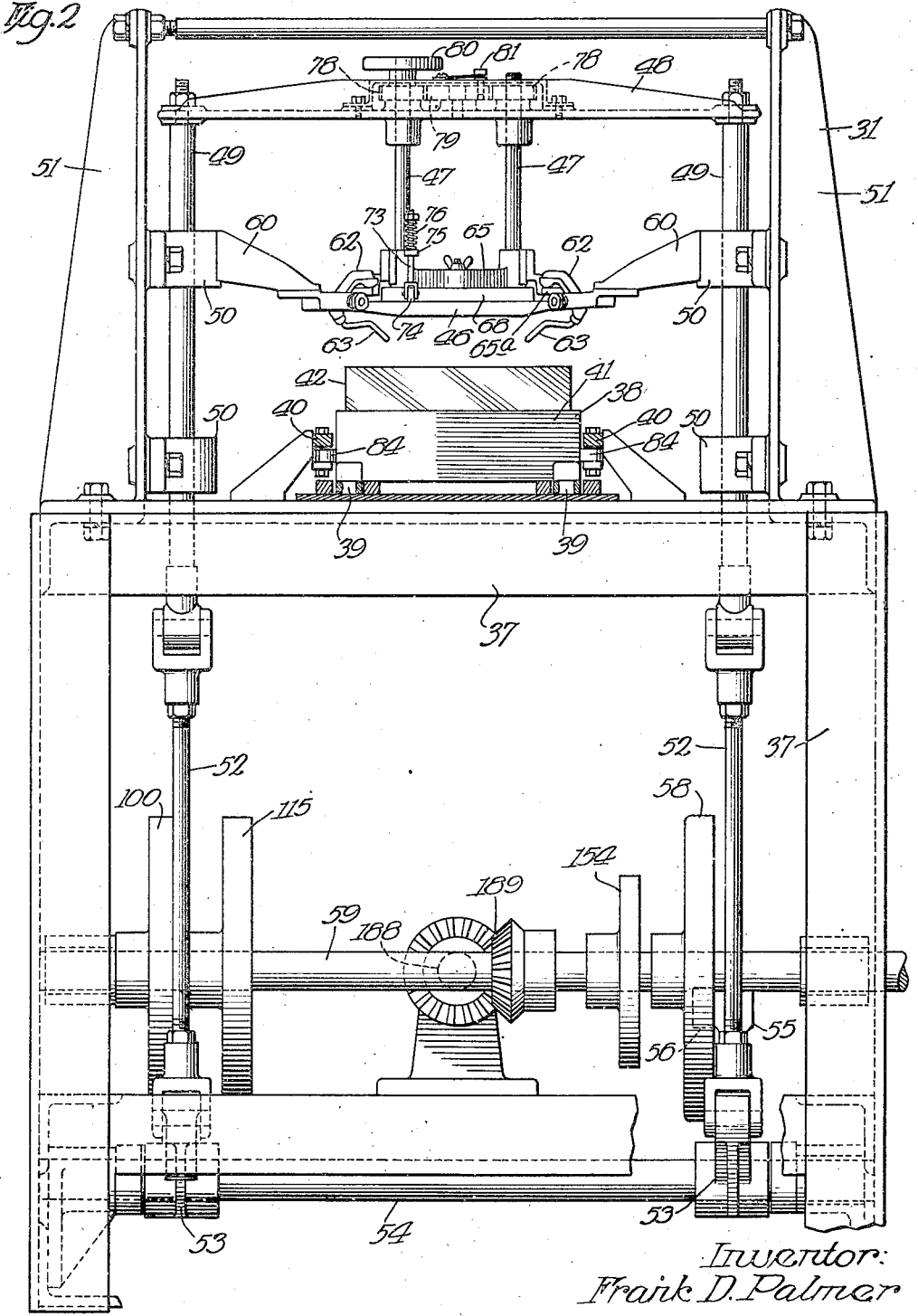

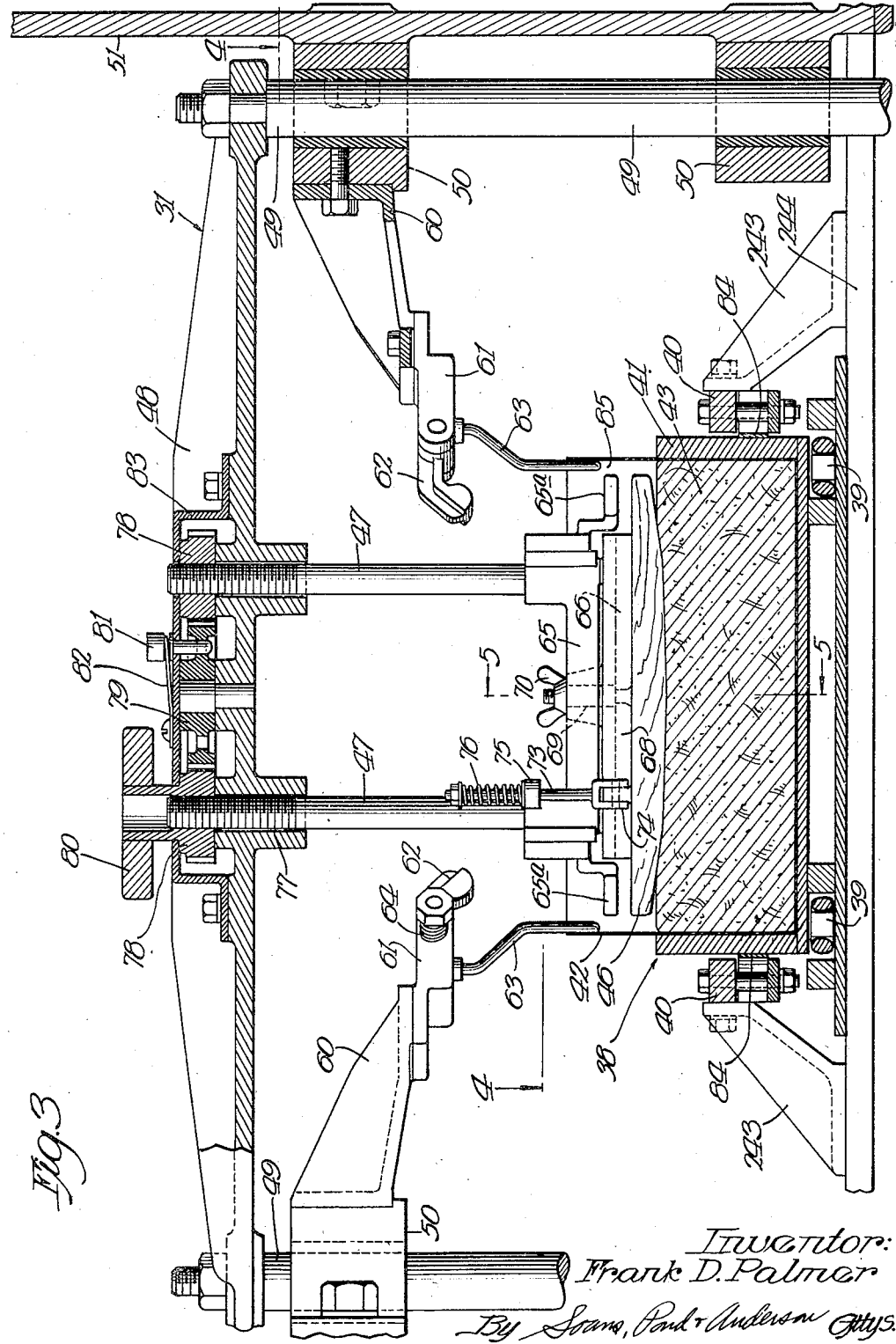

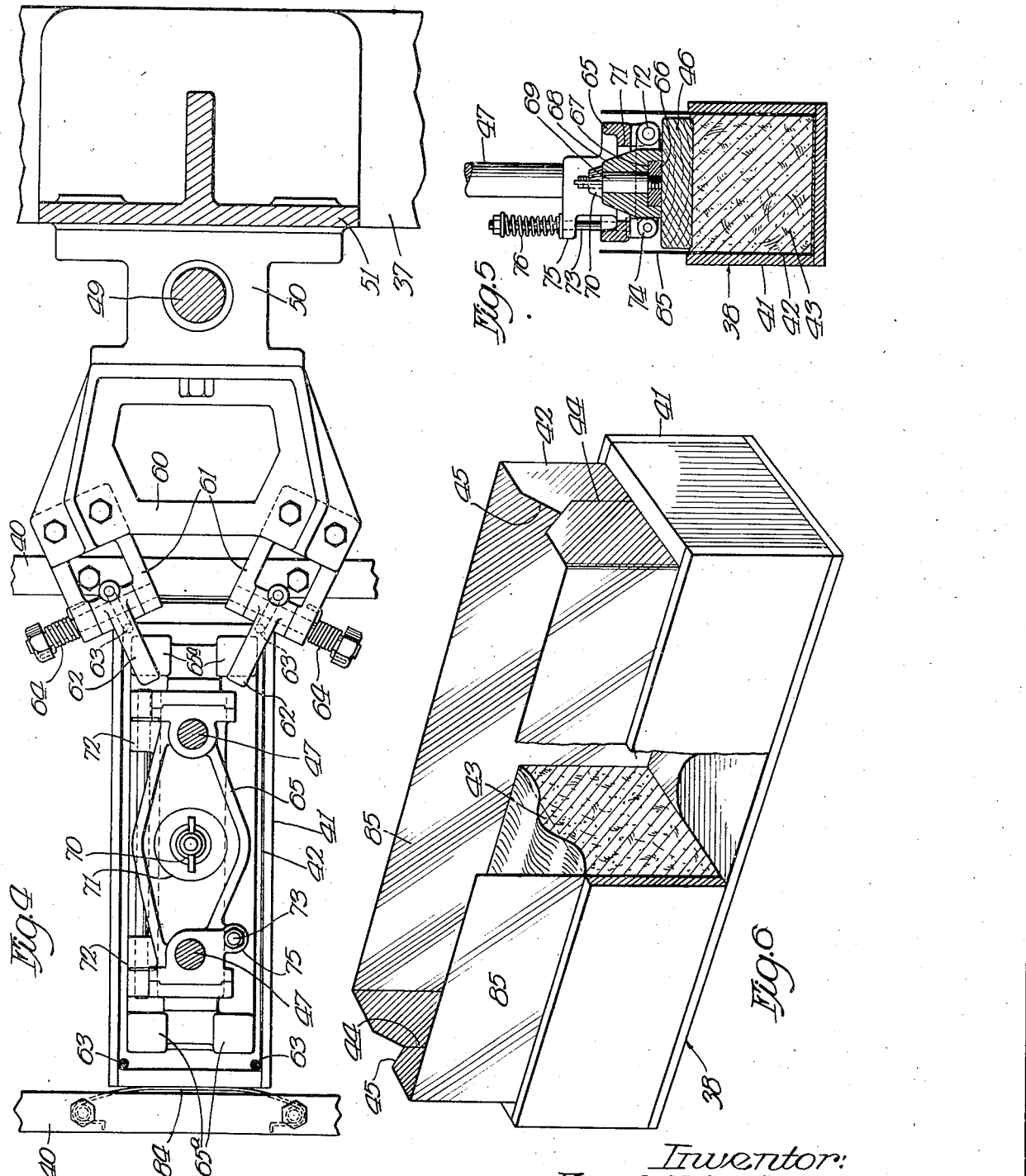

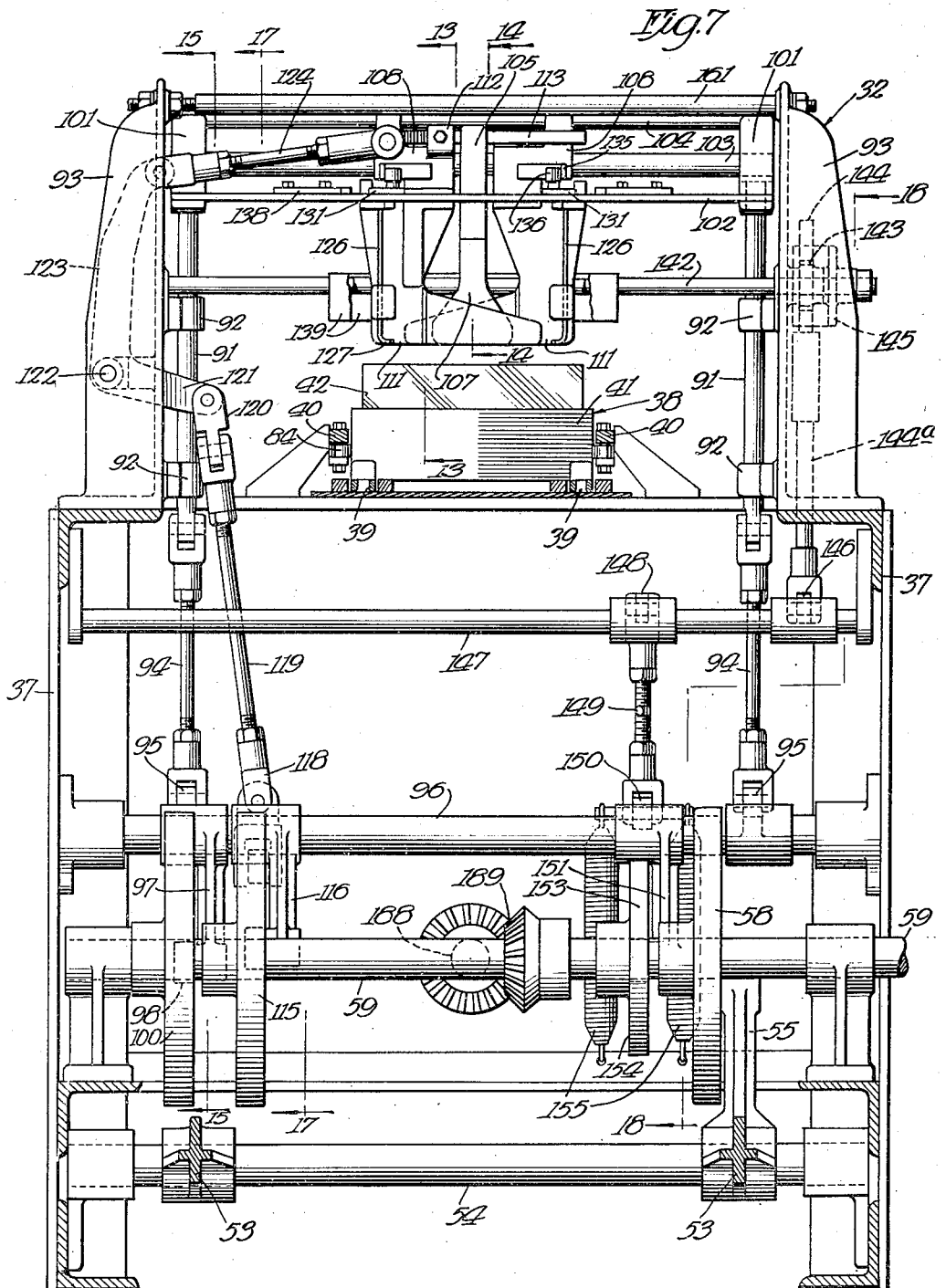

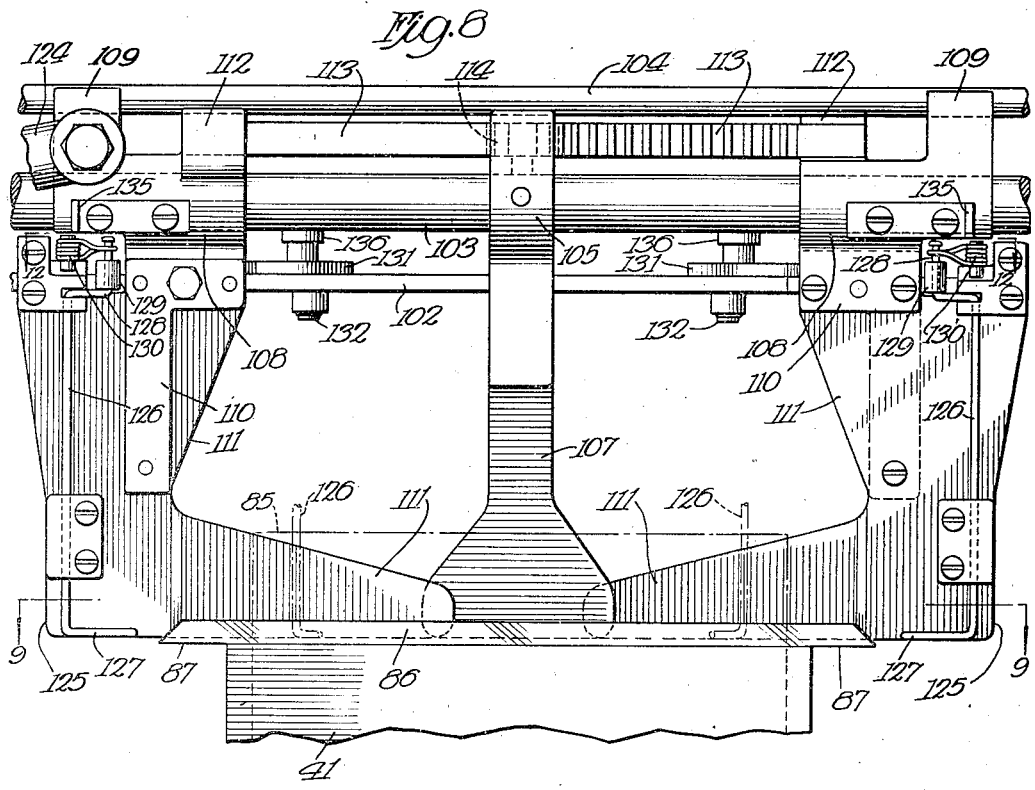
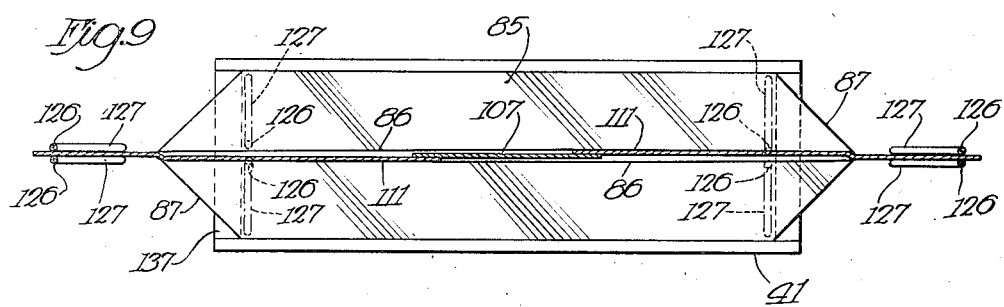
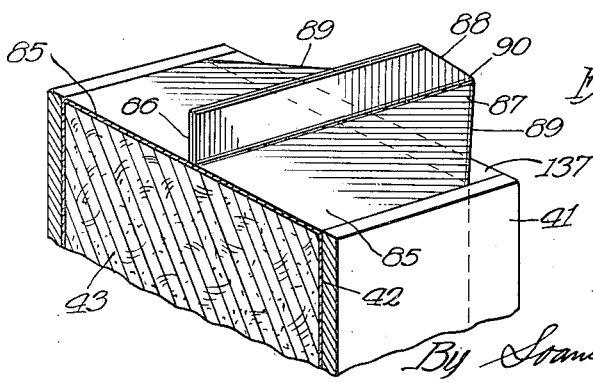

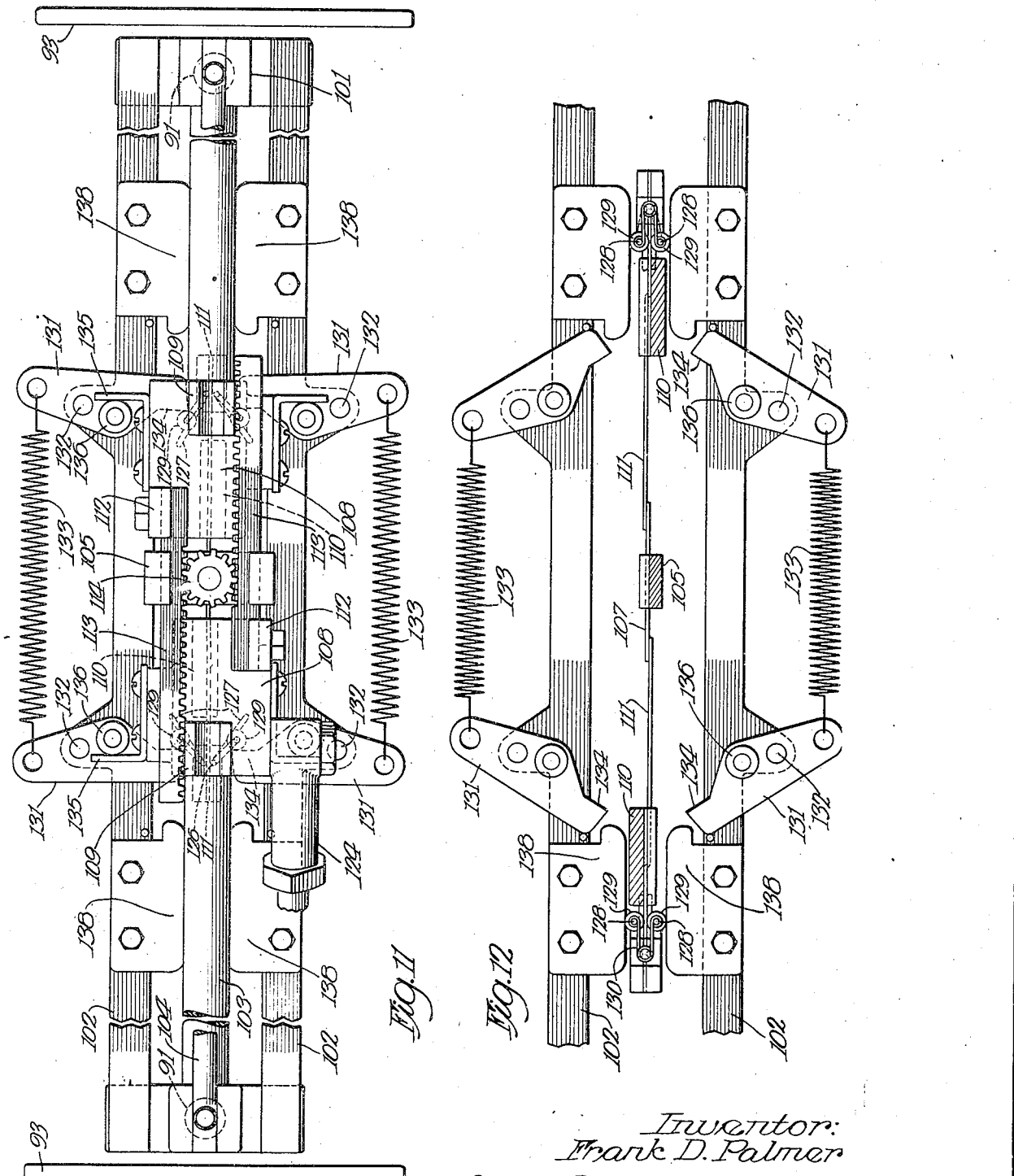

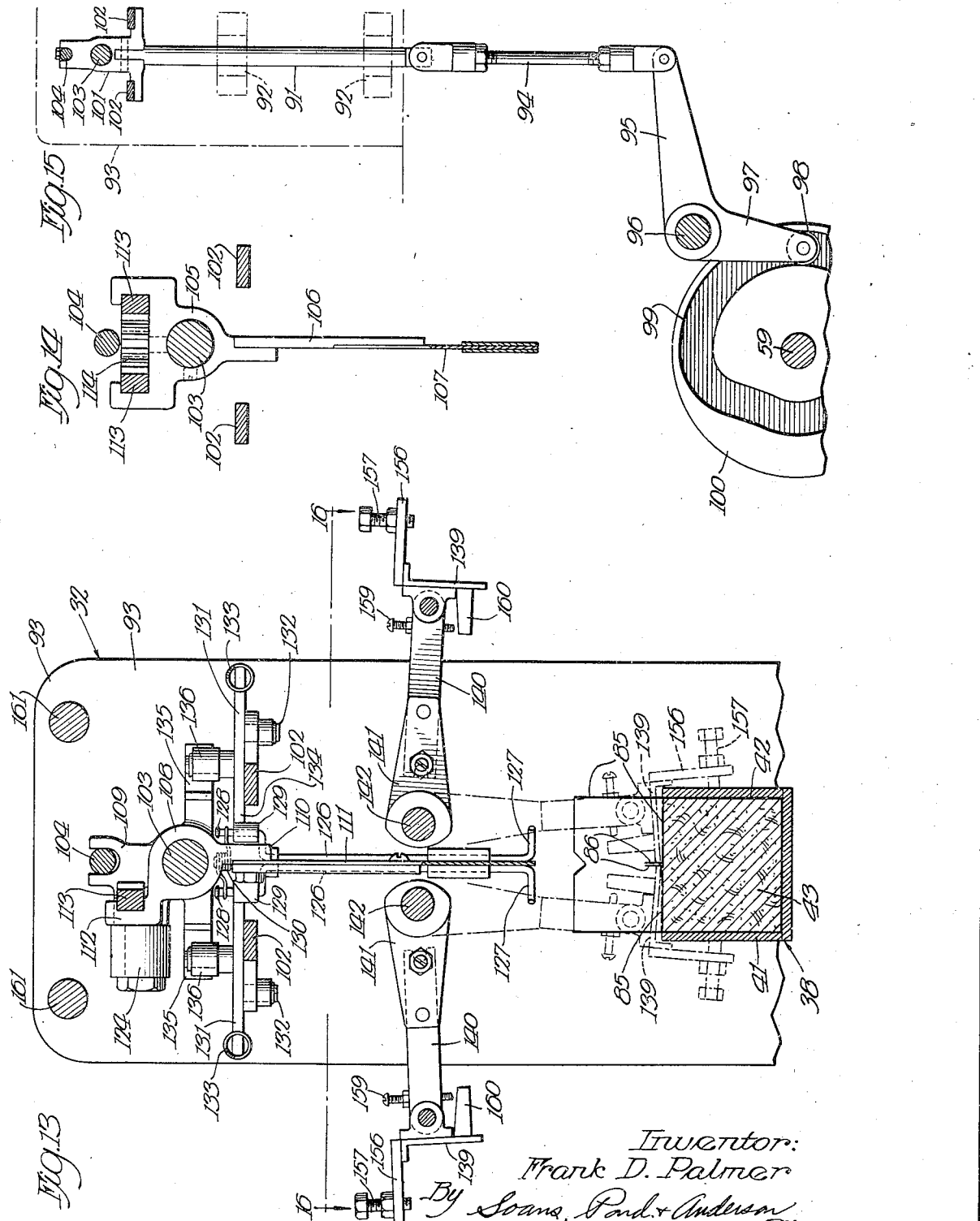

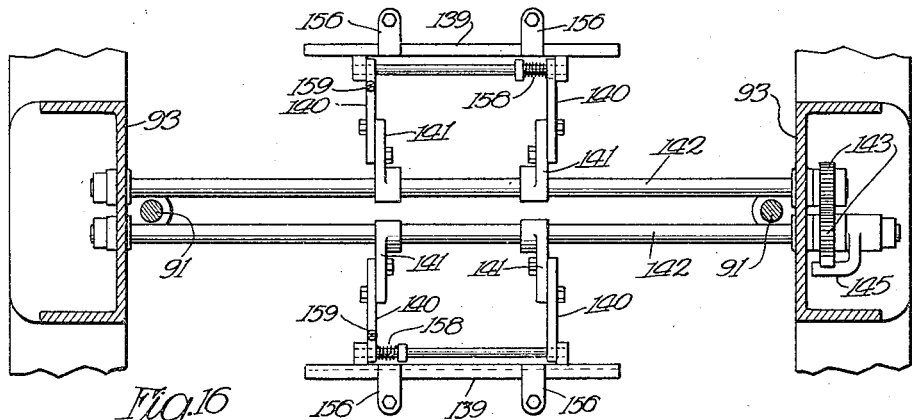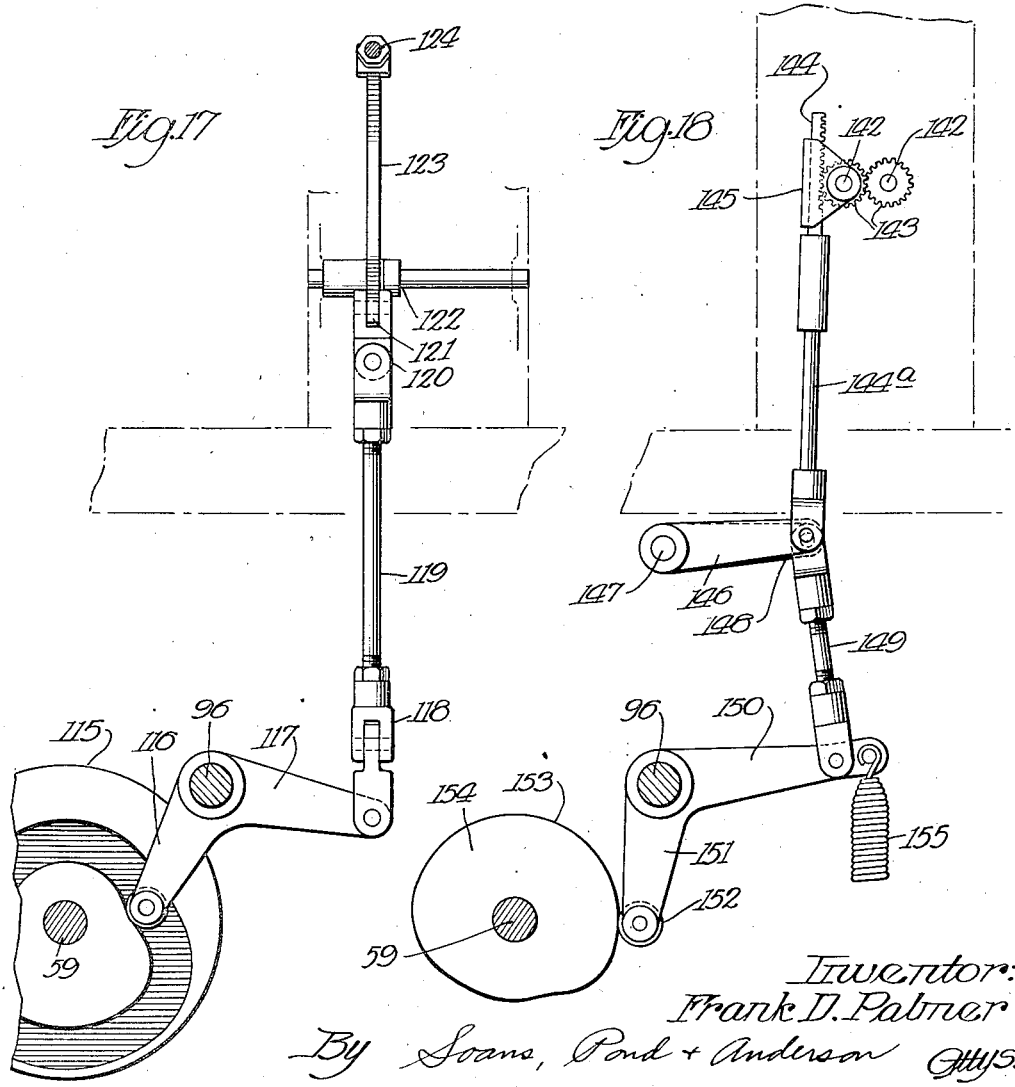

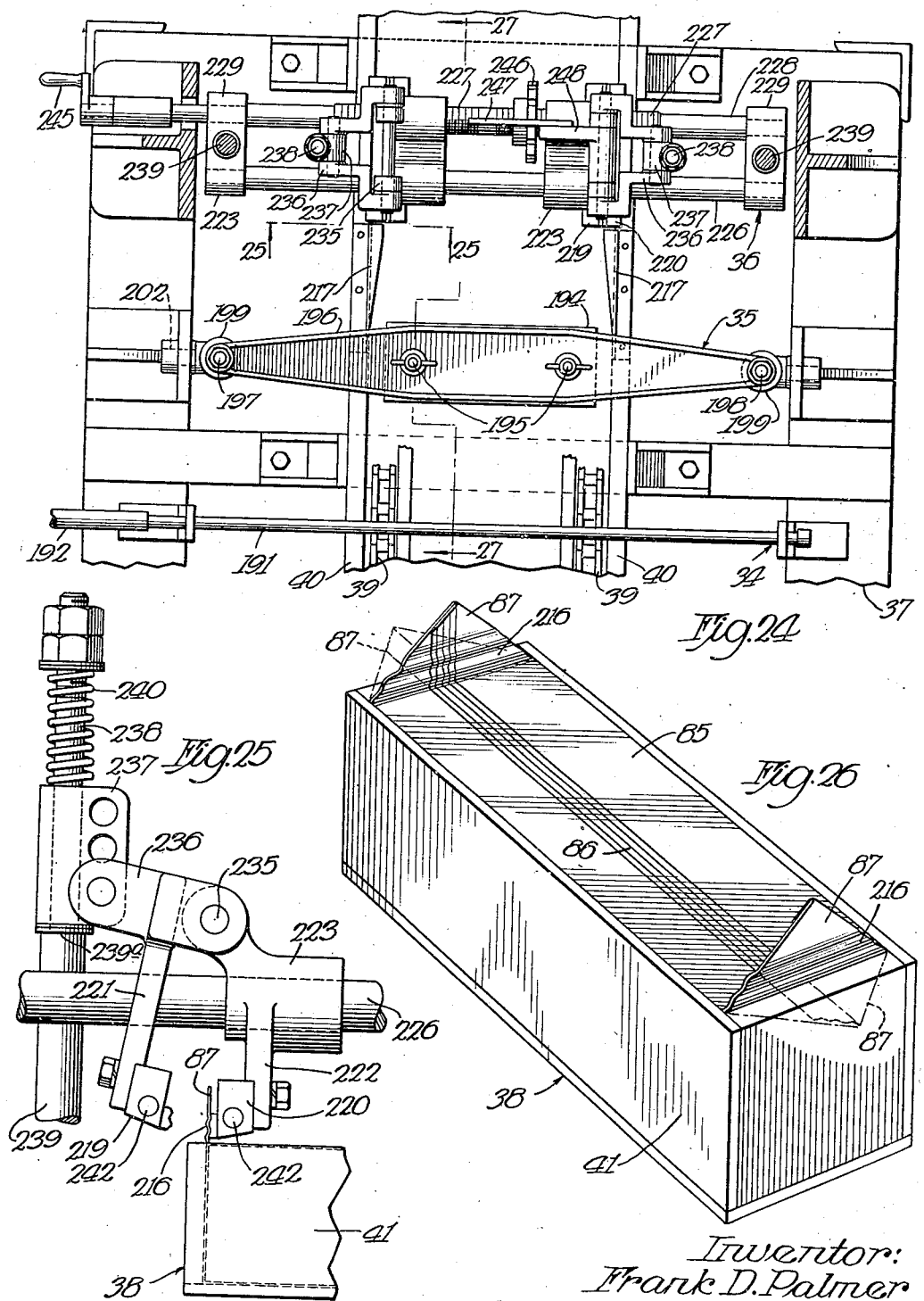

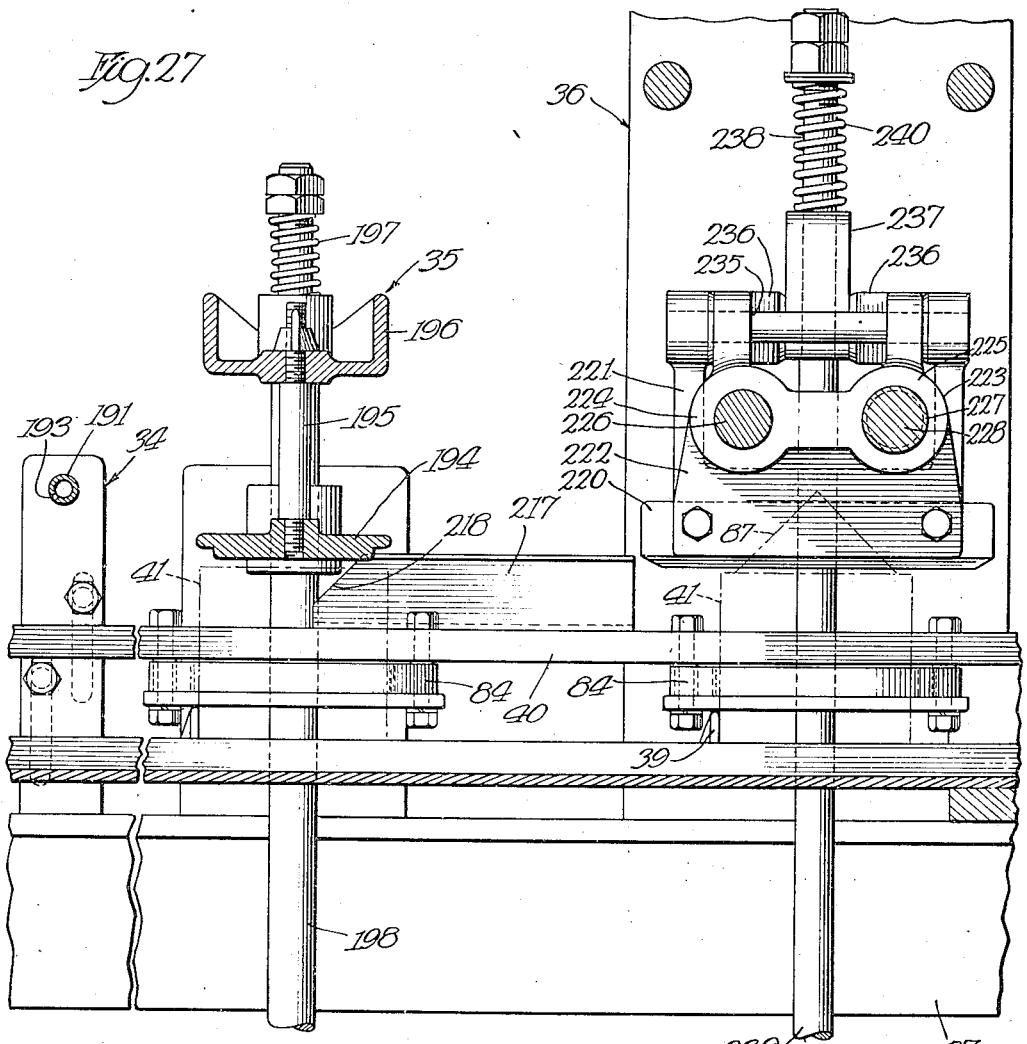
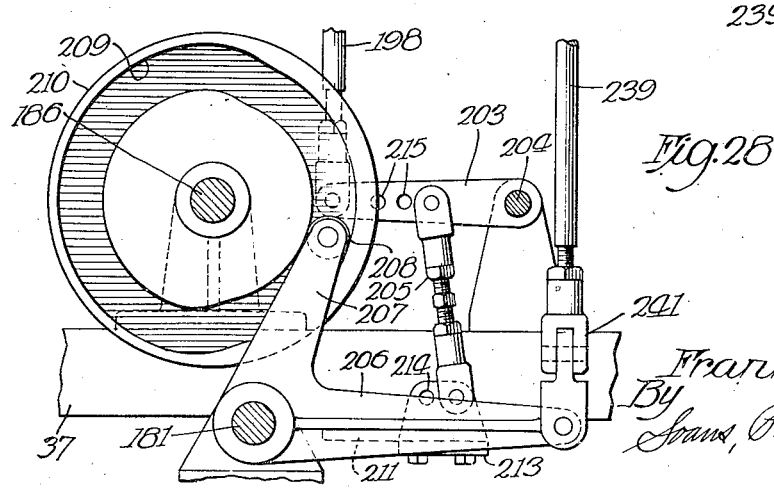

May 15, 1945.  F. D. PALMER  2,376,003
PACKAGING APPARATUS
Filed March 22, 1940  14 Sheets-Sheet 14

Inventor:
Frank D. Palmer
By Soans, Pond & Anderson
Attys.

Patented May 15, 1945

2,376,003

UNITED STATES PATENT OFFICE 2,376,003

PACKAGING APPARATUS

Frank D. Palmer, Chicago, Ill., assignor to Kraft Cheese Company, Chicago, Ill., a corporation of Delaware Application March 22, 1940, Serial No. 325,334

24 Claims. (Cl. 93—6)

This invention relates to an improved packaging apparatus and method and it has particular reference to a method and apparatus for closing a package after the same is filled with whatever material is being packaged.

In the packaging of products, especially of food products which tend to deteriorate upon exposure to air, it has been found practical to form an inner receptacle or liner of suitable impervious material such as metal foil, waxed paper and other prepared sheetings, and to position such receptacle within a relatively rigid outer container, after which the receptacle is filled with the product desired. The relatively rigid container which may be of suitable grade of paperboard or a wooden box, is employed for the purpose of protecting the relatively weak sheet from which the liner is formed from injury, and the liner is preferably so formed that it constitutes a leak-proof receptacle open only at its top. The top portions of the side walls of the receptacle are adapted to be folded to cover and close the top of the receptacle. The sheeting employed for forming the receptacle is preferably so treated or coated that portions thereof may be joined face to face by the application of heat or pressure or both to effect fusion of coatings or the like on the joined faces of the material.

The main objects of the present invention are to provide apparatus for effectively closing a package of the character indicated after the same is filled with a food product; to provide a method and apparatus whereby a package of the character indicated may be effectively closed and sealed so as to provide a hermetically sealed container for the package content; to provide apparatus which is capable of preparing the surface of the package content to improve the general appearance of the package and to facilitate the closing of the liner or inner receptacle over such prepared surface; to provide a method and apparatus for closing a package of the character indicated whereby air will be expressed from within the receptacle so as to improve the ability of the package to indefinitely preserve the package content; to provide a method and apparatus adapted to operate smoothly, quietly and continuously for long periods of time without interruption and at a relatively high speed in keeping with the rate at which receptacles are formed and filled by other apparatus; to provide apparatus of the character indicated which will be adjustable to operate on different sizes of packages; and in general it is the object of the invention to provide an improved method and apparatus for closing packages.

Other objects and advantages of the invention will be understood by reference to the following specification and accompanying drawings (fourteen sheets) wherein there is illustrated a method and apparatus of the character set forth.

In the drawings:

Figure 1 is a side elevation of apparatus embodying a selected form of my invention and capable of practicing the method of my invention;

Figure 2 is a view of the left-hand end of the apparatus as shown in Figure 1;

Figure 3 is a section on the line 3—3 of Figure 1;

Figure 29:
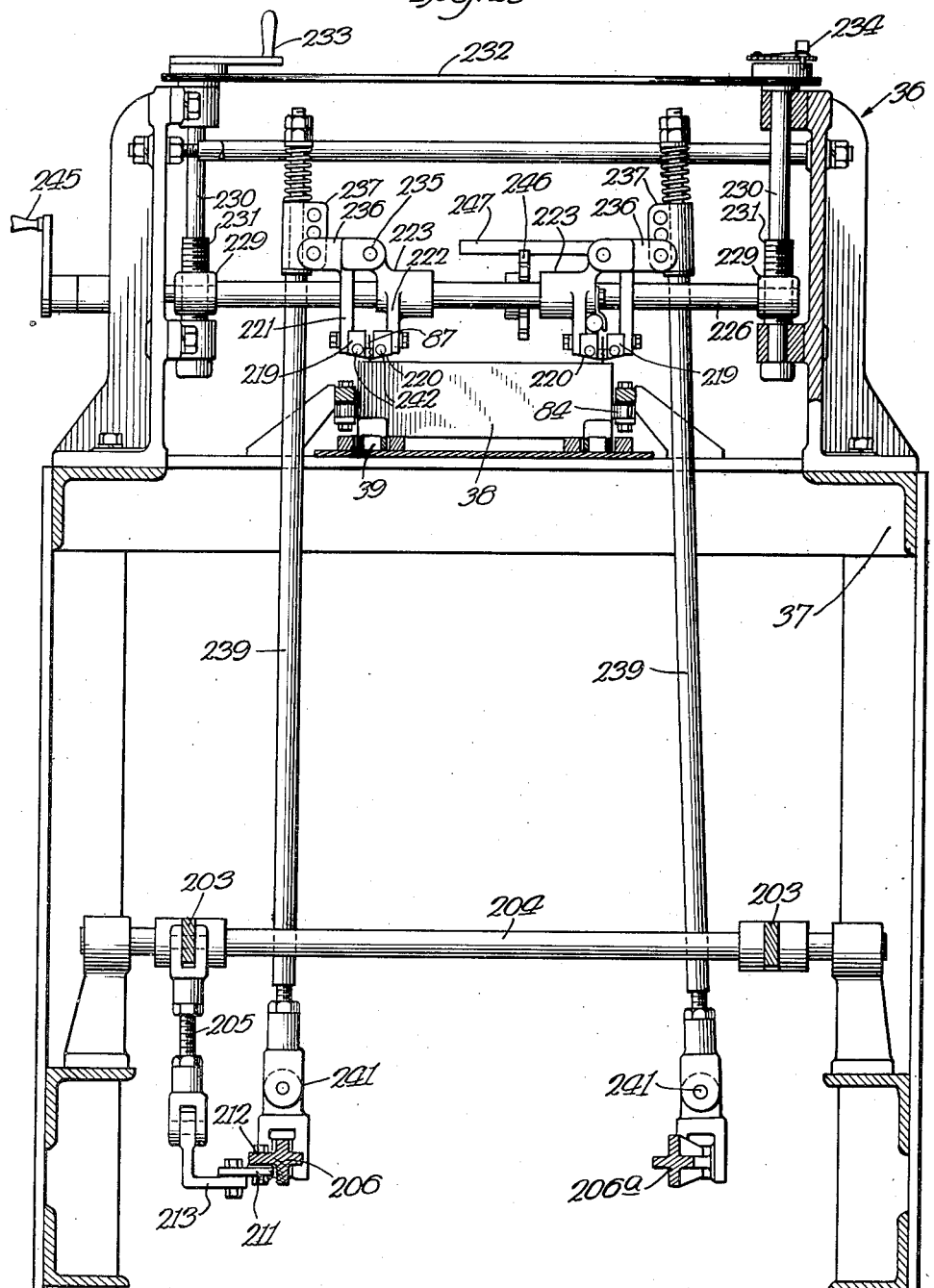

Figures 4 and 5 are sections respectively on the lines 4—4 and 5—5 of Figure 3;

Figure 6 is a perspective of a package filled with a food product and adapted to be closed by the method and apparatus of my invention;

Figure 7 is a section on the line 7—7 of Figure 1;

Figure 8 is a side elevation of a portion of the mechanism shown in Figure 7 but on an enlarged scale;

Figure 9 is a section on the line 9—9 of Figure 8;

Figure 10 is a perspective of an end portion of a package showing one condition of the top of the receptacle during the process of closing the same by my method and apparatus;

Figure 11 is a plan of the mechanism shown in Figure 8;

Figure 12 is a section on the line 12—12 of Figure 8;

Figures 13, 14 and 15 are sections respectively on the lines 13—13 and 14—14 and 15—15 of Figure 7;

Figure 16 is a plan section on the line 16—16 of Figure 13.

Figures 17 and 18 are sections respectively on the lines 17—17 and 18—18 of Figure 7;

Figure 19 is a section on the line 19—19 of Figure 1;

Figure 20 is a section on the line 20—20 of Figure 19;

Figure 21 is a perspective showing an end portion of the package with one of the steps in the operation of sealing the same completed as effected by the mechanism illustrated in Figures 19 and 20;

Figures 22 and 23 are sections respectively on the lines 22—22 and 23—23 on Figure 1;

Figure 24 is a plan section on the line 24—24 of Figure 1;

Figure 25 is a side elevation of a part of the mechanism shown in Figure 24 as indicated by the line 25—25 of Figure 24;

Figure 26 is a perspective of a package closed and sealed by my improved method and apparatus, certain portions of the sealed receptacle being shown in an upstanding or unfolded position so as to more clearly illustrate the structure;

Figure 27 is a section on the line 27—27 of Figure 24;

Figure 28 is a side elevation on an enlarged scale of certain mechanism shown in Figure 1 for operating the portions of the apparatus shown in Figures 22 to 27, inclusive; and Figure 29 is a cross section on the line 29—29 of Figure 1.

Referring now to the drawings, the apparatus therein shown comprises, in effect, six operating units respectively designated 31, 32, 33, 34, 35 and 36, all of said units being mounted on a suitable supporting frame designated in its entirety 37, the latter being formed of angle iron or any other suitable construction.

The units of mechanism 31 to 36, inclusive, operate on packages indicated at 38 which are carried through the mechanism on a suitable chain or other conveyor indicated at 39. The details of the conveyor construction are unimportant since they may be of any conventional form, it being merely important that the conveyor be equipped with suitable flights or stops for engaging the packages so as to be capable of positively propelling them in predetermined, spaced relation and at a predetermined rate of travel. The conveyor is, for the purpose of this mechanism, driven intermittently so that the packages come to rest in the operating zone of some of the units of mechanism and the conveyor may be one which carries the empty receptacles through suitable filling apparatus and continues to carry the packages when filled into the zone of operation of the units 31 to 36, inclusive.

Since the details of the intermittent drive for the chain form no part of the present invention, and since such drives are well known in the art, such details are not herein shown. Suitable side guides such as indicated at 40 may be provided for engagement with the ends of the packages to maintain the same within a given path of travel on the conveyor 39.

The filled packages as operated upon by the mechanism herein shown are delivered to the apparatus in the form illustrated in Figure 6. As there illustrated, the package comprises an outer receptacle 41 which may be of wood, cardboard or other suitable material, a liner or inner receptacle 42 of suitable impervious sheet material, and a filling 43 of material to be packaged.

The liner or receptacle 42 should be understood as being a leak-proof receptacle having been so formed that no leakage occurs at any of the corners or the end joints such as indicated at 44. The ends of the package are also provided with recesses or notches such as indicated at 45 for a purpose which will presently appear.

The content of the package as shown in Figure 6 may be understood to be cheese, and the wavy form of the top surface thereof is representative of the uneven surface which results from the filling of the receptacle by certain methods of apparatus now in use for that purpose.

The liner or receptacle 42 in practical embodiment is formed of sheet material embodying a thermoplastic coating on the surface which forms the inside of the receptacle so that portions of such surface may be joined in face to face relation by the application of heat or pressure or both.

Although the package herein disclosed for closing by the mechanism is a cheese package, it should be understood that the apparatus is not limited in its usefulness to packaging of that specific material. The apparatus is readily adapted to the closing of packages of other materials.

Packages of the form illustrated in Figure 6 are carried step by step by the conveyor 39 into the zone of operation of unit 31 of mechanism, the details of which are best illustrated in Figures 2 to 5, inclusive. This unit of mechanism is designed to prepare the top surface of the package content to improve the appearance of the package when finished and to facilitate the closing of the package by folding the upwardly projecting side wall portions of the receptacle inwardly over the top of the package content. The operation is one of more or less flattening said surface and it is performed by plunger mechanism comprising a head 46, preferably but not necessarily of wood, said head being carried through the agency of rods 47, 47 by a cross-head 48 which is mounted for vertical movement.

The cross-head 48 is suitably mounted on the upper ends of posts 49, 49 which are vertically slidably mounted in suitable bearings 50, 50 carried by upstanding end members 51, 51 of the mechanism. The lower ends of the posts 49, 49 are connected by means of links 52, 52 to the outer ends of arms such as indicated at 53 (Figure 1) which are mounted on a cross shaft 54 which is suitably journalled for rocking movement in bearings carried by the main frame 37. One of the arms 53 constitutes a part of a bell crank having another arm 55 which carries at its free end a roller 56. The roller 56 engages a cam groove 57 in a disc 58 which is mounted on a main driving shaft 59 which is also suitably journalled for rotation in bearing brackets carried by the main frame 37. As shown in Figure 2, the main drive shaft 59 is extended at one side of the machine and driving power is applied to said extension of the shaft, either an independent source of power being employed or a suitable connection to other driven apparatus being provided.

The cam groove 57 is suitably shaped to effect vertical reciprocation of the posts 49 and parts carried by the upper ends thereof, the timing of the reciprocation being so related to the intermittent travel of the packages on the conveyor 39 that the pressing head 46 will enter the packages when the latter are stationary.

Since the liner or inner receptacle 42 is of flexible sheet material it may not always enter the closing mechanism in a fully distended or upright condition as illustrated in Figure 6. In some instances the upwardly extending side and end wall portions of the wrapper will be more or less buckled, falling either inwardly or outwardly, sometimes in such a manner as to interfere with the normal entrance of the presser head 46 into the receptacle. For the purpose of providing free passage for the presser head 46 into the receptacle there are provided devices adapted to operate on each end of the receptacle to straighten up and distend the same.

The liner straightening or distending devices comprise, at each side of the machine, a bracket 60 which is formed as an extension of the upper bearing members 50 or independently thereof and suitably secured thereto. At the inner end of each of said brackets are mounted pairs of ears 61, 61 disposed in angular relation as shown in Figure 4. Said ears 61, 61 pivotally support arms 62 from which depend fingers 63. The arms 62 and fingers 63 are normally urged to swing in a downward direction by suitable means such as coil springs 64 associated with the pivot shafts of the arms 62.

The arms 62 extend inwardly so as to overlie ears or lugs 65a formed integrally with a mounting member 65 carried by the rods 47, 47. As indicated in Figure 2, the arms 62, 62 and their respective fingers 63 are normally maintained in an elevated position by engagement with the lugs 65a when said mounting bracket 65 is in elevated position. In the position of the parts as shown in Figure 2, the fingers 63 are spaced well above the upper edge of the receptacle 42 so as not to interfere with the free movement of the latter on the conveyor 39. However, when the mounting member 65 is moved downwardly, the springs 64 are permitted to rock the fingers 63 downwardly and outwardly. By examination of Figure 4, it will be understood that the fingers 63 are so positioned that when permitted to rock downwardly and outwardly it will enter the receptacle and apply sufficient stretching force to the walls thereof to distend the same as indicated in Figures 3 and 4 whereby the said portions of the receptacle will be held out of the path of movement of the presser member 46 into the receptacle.

Suitable stop means may be provided if desired for limiting the downward and outward rocking movement of the fingers 63 under the influence of the springs 64 but such means is not necessary since the walls of the receptacle are normally of ample strength to limit such rocking movement.

The presser head 46, when the apparatus is designed for packaging cheese or like material, is preferably formed of wood. It will be apparent that materials other than wood may be employed if desired. The head 46 has secured to its upper face a bar 66 which fits in a suitably formed recess 67 in a bracket plate 68. By reason of the interfitting relation of the bar 66 and the bracket plate 68, the head 46 is held against horizontal turning movement relative to said bracket plate.

A post 69 suitably secured to the head 46 through the agency of the bar 66 fits through a suitable aperture in the bracket plate 68 and at its upper end receives a wing nut 70 by means of which the head 46 is held to the bracket plate 68. As shown, the post 69 is elongated and the bracket plate 68 is provided with an upwardly extending boss which projects upwardly through an opening 71 in the mounting member 65 so as to position the wing nut 70 in an accessible position above the mounting member 65.

The bracket plate 68 is hingedly connected at one side as indicated at 72, 72 to the mounting member 65. The opposite side of the bracket plate 68 is connected to the member 65 through the agency of a rod 73 which is pivoted at its lower end as shown at 74 to the member 68 and has its upper portion extended through an ear 75 provided as a part of the mounting member 65. A spring 76 disposed about the upper portion of the rod 73 and confined between a nut thereon, and the ear 75 yieldingly maintains the adjacent side of the bracket plate 68 in normal parallel relation to the mounting member 65 as illustrated. However, upon upward movement of the presser head carrying structure, the side of the head 46 which is connected by the hinges 42 to the mounting member 65 will be positively and initially withdrawn while the opposite side is permitted to remain in lowered position incident to its tendency to stick to the package content.

The spring 76 serves, however, to ultimately pull the sticking side of the head 46 away from the package content and restore the head to its normal parallel or horizontal position. The described hinging or locking action of the presser head 46 is advantageous in that it facilitates the breaking away of the presser head from the package content so as to leave a smooth top surface on the content. The said rocking action further is effective in preventing the presser head from picking up or pulling away from the package content portions thereof.

The vertical stroke of the presser mechanism may be varied by appropriate changes in the operating cam or the lever arm lengths of the bell crank arms 53, 55. However, the presser mechanism as described is capable of handling a substantial range of package sizes merely by adjusting the vertical position of the presser head 46 relative to the cross head 48. Such adjustment also facilitates the proper setting of the head for best results in respect of any given size of package. In this instance, the presser head structure is vertically adjustable relative to the cross head 48 by having the rods 47, 47 vertically slidably disposed in suitable bearing apertures 77 formed in the cross head 48 and providing adjusting nuts 78, 78 on threaded upper end portions of said rods. In this instance, the nuts 78, 78 are in the form of spur gears which mesh with an intermediate or pinion gear 79 which is suitably mounted for rotation as best indicated in Figure 3 on the cross head 48. One of the gears 78 is provided with an upward extension and handle part 80 whereby the same may be manually rotated.

Incident to the connecting gear 79, both gear nuts 78, 78 will be simultaneously rotated to thereby effect simultaneous and like vertical adjustment of the rod 77 in the cross head 78. Suitable means may be provided for locking the rods 77 in their adjusted position and in this instance a locking means is provided in the form of a pin 81 normally pressed by a leaf spring 82 into locking engagement with a portion of the intermediate gear 79, as clearly shown in Figure 3. The pin 71 may be pulled upwardly against the pressure of the spring 82 so as to release the gear 79, whereupon desired adjustment may be effected. A suitable cover or casing 83 is preferably provided for enclosing the adjusting gear mechanism.

For the purpose of firmly holding the package in stationary position during the operation of the distending fingers and presser head in unit 31 of the mechanism, suitable flexible spring devices indicated at 84 may be provided. Such spring devices frictionally hold the package but do not prevent normal forward movement of the package with the conveyor 39. Similar holding devices may advantageously be employed in connection with each of the units 32, 33, 35 and 36 of mechanism.

The presser head mechanism 31 serves to flatten and smooth the initially wavy surface 43 so as to facilitate the folding of the upwardly extending wall portions of the receptacle into flat, closing position. When the operation of the pressing mechanism is completed, the package is advanced to the mechanism unit 32 wherein upwardly extending portions of the wrapper are folded to close the receptacle. The wrapper folding mechanism comprises the unit 32, the details of which are best shown in Figures 7 to 18, inclusive, of the drawings.

The folding is so effected that the upwardly extending front and back side portions 85 of the wrapper are folded inwardly toward the longitudinal center of the top surface of the package content, said side portions being of such width that marginal edge portions are adapted to come into face to face, upstanding relation as indicated at 86 in Figure 10. Such folding of the side portions of the receptacle is more or less incident to the outward folding of the upstanding end portions of the wrapper into more or less triangular ear form as indicated at 87. The provision of the notches 45 in the end walls of the receptacle results in the angular or bevelled end 88 of the upstanding face to face portions 86, said bevel extending to the folded edges 89 of the triangular ends portions, so that at the extreme ends or points of the triangular end portions as indicated at 90 there is no fold but remains an incipient opening which is utilized in the folding operation as will presently appear.

The folding mechanism comprises mechanism which is vertically movable carried by a pair of rods 91, 91 which are suitably vertically slidably mounted in bearings 92, 92 carried by adjacent end frame members 93, 93 of the mechanism unit 32.

Each of said vertically adjustable rods 91 has a link 94 connected to its lower end and the opposite end of each link 94 connected to the free end of an arm 95 secured to a transverse shaft 96. One of the arms 95 constitutes one arm of a bell crank lever, the other arm of which is indicated at 97 and is provided adjacent its free end with a roller 98 which engages a cam groove 99 in a disc 100, carried by the transverse shaft 59.

The shaft 96 is suitably journalled in bearings carried by the main frame 37 and it will be apparent that the shaft is subjected to rocking action by the cam groove 99 and bell crank lever 97. The bell crank is secured to the shaft 96 so that both of the levers 95 are caused to rock simultaneously whereby the vertically adjustable rods 91, 91 will also be simultaneously reciprocated in a vertical direction.

The upper ends of the rods 91, 91 are provided with inverted T-shaped bracket members 101 and said bracket members are connected through the agency of a pair of bars 102, 102. Said bracket members 101 are also connected by means of a transversely extending shaft 103 which is secured at its ends in the respective brackets 101 so as to be non-rotatable. A smaller shaft 104, used for guide purposes, is also mounted at its ends in the respective brackets 101, the said bar 104 being in upwardly spaced relation to the shaft 103.

About mid-way of the length of the shaft 103 there is fixedly mounted on said shaft a central bracket 105 from which depends an arm 106 and a central plate 107. On opposite sides of the central bracket 105 there are slidably mounted on the shaft 103, brackets 108, 108 which include upwardly extending bifurcated portions 109, the latter embracing the guide rod 104 so as to prevent rotation of the brackets 108 about the shaft 103 while permitting horizontal sliding movement of said brackets along said shaft. Each of the brackets 108 has a depending ear 110 which supports a depending, more or less boot shaped plate member 111 which has its lower edge co-planar with the lower edge of the central plate 107. The plates 111 depending from the respective brackets 108 are oppositely disposed, so that one of said plates 111 is on each side of the central plate element 107, as more clearly appears in Figure 12.

Each bracket 108 is also provided with an upwardly extending ear part 112, such ears being arranged in oppositely disposed relation as is best seen in Figure 11. Each ear 112 has connected to it a rack bar 113, the respective rack bars extending in opposite directions from the respective ears 112 and being disposed in generally co-planar and parallel relation. The rack bars 113 are interconnected for simultaneous movement by means of a pinion gear 114, which is rotatably mounted on the upper end of the central bracket 105 which is formed as shown in Figure 14 to provide guideways for the respective rack bars 113, to assist in maintaining the same in operative relation to the pinion gear 114.

It will be apparent that when one of the brackets 108 is caused to slide horizontally along the shaft 103, oppositely directed sliding movement of the other bracket 108 will be simultaneously effected through the said rack bar and pinion connection.

Sliding movement to the said rack bars is effected by means of a cam 115 which is operatively connected to the arm 116 of a bell crank lever which is rockably mounted on the shaft 96. The other arm 117 of said bell crank lever is connected by means of a universal joint 118 to a connecting rod 119, the other end of which is connected by a similar universal joint 120 to one arm 121 of another bell crank which is pivotally mounted as indicated at 122 in the adjacent end frame member 93. The other arm 123 of the last mentioned bell crank is connected by a suitable link 124 to the adjacent horizontally slidable member 108.

The cam 115 is operative to effect simultaneous, outward endwise movement of the plates 111, 111. During the operation of folding a receptacle to close the same, the cam 100 first effects downward movement of the apparatus so as to cause the members 107, and 111, 111 to enter the receptacle, after which the cam 115 effects the said spreading movement of the members 111, 111. The normal inoperative position of the members 111, 111 is illustrated in Figure 7 and the maximum spread thereof is shown in Figure 8.

In connection with other devices about to be explained, the boots or plates 111, 111 effect the folding of the upstanding side and end portions of the wrapper or receptacle to the condition illustrated in Figure 10. It will be apparent that the outer ends 125, 125 of the respective plates 111, 111 will engage the upstanding end walls of the receptacle approximately mid-way of their horizontal length and that as an incident to the outward endwise movement of said plates, said end walls will be folded outwardly and downwardly. It will also be apparent that there will be an accompanying tendency for the upstanding side wall portions to fold inwardly to the condition illustrated in Figure 10. To control and facilitate regularity and uniformity of such inward folding of the side walls, there is provided mechanism for guiding the formation of the end folds 89, 89 and also mechanism for substantially simultaneously tucking the upstanding side portions into their inwardly folded condition as shown at 85, 85 in Figure 10.

The mechanism for controlling the formation of the end folds 89, 89 comprises a pair of rods 126, 126 respectively mounted on opposite sides of each of the boot-like plates 111, 111 near their outer ends 125 as is clearly shown in Figures 7 and 8. Said rods 126, 126 are rotatably mounted in suitable bearings carried by the respective plates 111, 111 or their supporting brackets, and the lower ends of said rods are bent at substantially right angles to form fold-forming guide portions 127, 127, the bottom sides of which are substantially co-planar with the lower edges of the members 111, 107, 111.

The upper ends of the rods 126, 126 are so bent as to provide crank pins 128 on which are disposed rollers 129. Suitable springs 130, 130 are provided and arranged to normally urge said rods 126, 126 to rotate in opposite directions so as to spread the lower end guide portions 127 thereof.

In the normal or rest position of the mechanism, the fingers 127 at the lower ends of said rods 126 are disposed in angular relation to each other substantially as shown in Figure 11, so that upon lowering of the mechanism, the said fingers will enter the receptacle without engaging the upper edges of the walls thereof even though the same be more or less bent inwardly. For the purpose of maintaining the fingers in the said angular relationship, there are provided for cooperation with each roller 129, levers such as indicated at 131, said levers being pivotally mounted as indicated at 132 on suitable ears formed integral with the supporting bars 102. The levers 131, associated with each supporting bar 102, are arranged in oppositely disposed relation and they have their outer ends connected by a tension spring 133 which tends to pull the outer ends of the levers toward each other so as to thereby spread or move outwardly the inner ends 134 of said levers.

The inner ends of said levers are adapted to engage the rollers 129 on the crank pins 138 to prevent rocking movement of said rods 126 under the influence of the respective springs 130. The levers 131 are normally held against rocking movement under the influence of the springs 133 by means of bracket arms such as indicated at 135 which extend laterally from the slidably mounted members 108 and serve to engage rollers 136 carried by said levers 131.

Upon outward endwise movement of the members 108, the bracket arms 135 will correspondingly move outwardly and thus permit the springs 133 to rock the levers 131. The inner ends 134 of said levers will thus move outwardly so as to permit the springs 130 to rock the rods 126 and fingers 127 outwardly. Such rocking movement is permitted to continue until the fingers 127 of each pair of rods 126 assume a substantially transversely aligned position as indicated in dotted lines in Figure 9. When the fingers reach the transversely extending straight-line position shown in dotted lines in Figure 9, they are closely adjacent and substantially parallel to the inside wall of one end of the package and immediately above the plane of the top edge of such wall (see Figure 8).

Continued outward endwise movement of the fingers 127 has the effect of folding the initially upstanding end wall portion of the receptacle 42 outwardly over the upper edge 137 of the adjacent end wall of the outer container 41. About the time that the fingers 127 began to cross over the said upper edge 137, the rollers 129 on the crank pins 128 at the upper ends of the finger rods 126 engage stationary cam plates 138 which are carried by the supporting bars 102. Said cam plates 138 serve to rock the rods 126 so as to cause said fingers 127 to recede at their outer ends relative to the outward movement of the respective rods 126. The rocking action of the fingers 127 is such that they fold inwardly toward each other until they ultimately assume parallel positions as indicated in full lines in Figure 9.

The said rocking movement of the fingers and their continued travel endwise of the package, effects the formation of well defined end folds 89, 89 (Figure 10) and thereby controls the shape assumed by the outwardly folded end portions. When the wrapper end portions are folded outwardly, the wrapper side portions 85, 85 are folded inwardly, these portions being more or less automatically pulled inwardly to their folded position by the outward and diagonal folding of the end portions. The fingers 127, 127 emerge from within the folded receptacle portions through the openings 90 which result from the notches 45 in the end portions of the receptacle as aforesaid.

Upon completion of the folding operation by the fingers 127, 127 and a further operation presently to be described, the package is moved out of the zone of operation of unit 32 of mechanism and the fingers returned to their inwardly disposed initial position. During the return movement, and after the rollers 129 leave the cams 138, and after said rollers reach a position just slightly in front of the ends 134 of the pivoted levers 131, the angle brackets 135 actuate said levers 131 so as to control and limit the movement of the fingers 127, 127 against the rocking movement urged by the springs 130. The pivoted lever arrangement is desirable in that it provides an efficient means for controlling the pivotal movement of the finger rods 126 notwithstanding the very short travel distance during which said fingers must be swung from their initial angular positions to their transversely extending aligned positions. Stationary cams may be substituted but involve certain difficulties due to the short-length endwise movement of the parts during which the relatively extensive rocking movement of the fingers must be effected.

In the unit 32 of mechanism, and associated with said folding fingers 127, 127 and centering plates 107, and 111, 111, there are provided tucking devices intended to press the folded side portions 85, 85 of the wrapper into adhering contact with the top of the package content. When the content is cheese or other material which inherently has an adhesive surface characteristic, said wrapper portions 85 are pressed into contact with the package content so as to extrude air from within the wrapper and also so as to hold the folded wrapper side portions in folded position preparatory to subsequent sealing operations.

In this instance, the tucking means comprises a pair of longitudinally extending bars 139, 139 respectively pivotally mounted on the outer ends of arms 140, 140 which are longitudinally adjustably mounted on arms 141, 141 which are carried by rock shafts 142, 142.

The shafts 142, 142 are suitably journalled in the side frames 93, 93 of the mechanism unit 32 and are interconnected at one end by means of intermeshing gears 143. Rocking movement of the shafts 142, 142 simultaneously in opposite directions is effected by means of a rack bar 144 which meshes with one of the gears 143 and is held in operative relation thereto by a bracket 145, which is pivotally supported by an extension of one of the shafts 142. Said rack bar 144 is extended by means of a rod 144a which has its lower end connected to an arm 146 which is secured at its other end to a suitably journalled cross shaft 147. The cross shaft 147 also carries an arm 148 which is connected by a link 149 to one arm 150 of a bell crank lever which is rockably mounted on the shaft 96. The last mentioned bell crank lever also has an arm 151 which carries a roller 152 which rides on the cam periphery 153 of a disc 154 carried by the main drive shaft 59. A pair of springs 155, stretched between a cross bar of the main frame and the free end of the bell crank arm 150 serves to maintain the cam-following roller 152 in engagement with the cam edge 153.

It will be seen that the cam 153 is operative to effect reciprocation of the rack bar 144 to thereby effect oscillation of the shafts 142, 142 with corresponding movement of the tucking members 139, 139.

The tucking members 139 are provided with laterally extending bracket parts 156 which carry adjustable screw members 157, the latter being adapted to engage the sides of the package container 41 as clearly shown in broken lines in Figure 13. The screws 157 are so adjusted that incident to their engagement with the sides of the container 41, the members 139 will be given at least a slight downward movement to insure adhering contact of the wrapper portions 85, 85 with the surface of said content. The members 139, 139 serve to insure the formation of relatively sharp folds between the upwardly extending marginal portions 86 and the inwardly folded side portions 85, 85 and they serve to more or less stretch said folded portions 85 inwardly over the top of the package content to thereby insure relatively tight wrapping of the content in the wrapper receptacle 42.

The tucking devices 139, 139 reach their fully advanced position as shown in broken lines in Figure 13 at about the time the fingers 127, 127 clear the escape openings 90 in the ends of the wrappers and the downward rocking movement of said members 139, 139 is initiated at about the same time or shortly after the outward endwise folding movement of the fingers 127, 127 is initiated. Hence these two elements of mechanism are simultaneously in movement but there is such a synchronization thereof that said fingers 127, 127 complete their work on the wrapper immediately before the tucking members 139, 139 do their most effective work on the wrapper. The members 139, 139 are not necessarily relied upon to effect any folding of the wrapper side portions 85, 85 since such folding is effected as an incident to the outward folding of the receptacle end portions as already explained. However, the members 139 may be in engagement with and tending to fold the wrapper side portions inwardly during the folding operation of the fingers 127, 127. Coil springs such as indicated at 158 may be associated with the pivotal mounting of the members 139 on the arms 148 to normally urge said members 139 to rock in an inwardly and upwardly direction on their pivot shafts so as to cause the leading edge of the respective members 139 to always clear the upper edge of the container 41. Such spring-effected rocking movement may, however, be limited by suitable, adjustable stop screw means 159 in cooperation with a suitable lug 160 carried by each member 139.

For rigidity of the structure and particularly of the mechanism unit 32, the end frames 93 thereof may be connected by means of spacing rods 161.

When the package has been operated upon by the unit 32 of mechanism, the wrapper or receptacle 42 is in the condition illustrated in Figure 10.

The next unit of mechanism, designated 33, is operative to seal the upstanding marginal portions 86 together. Such sealing may be effected by the application of heat or pressure or both, so as to cause a fusing of the coatings on the adjacent faces of said wrapper margins 86. In the present instance, the sealing means disclosed utilizes both heat and pressure but it will be understood that either one, more especially pressure, may be used alone to effect the desired sealing.

For the purpose of sealing the upstanding wrapper marginal portions 86, 86 together, there are employed, in this instance, pairs of heated sealing bars 162, carried at the free ends of spring arms 163, 163 which in turn are carried by brackets 164, 164, carried respectively by shafts 165, 165 which are respectively journalled in suitable brackets 166, 166 depending from a cross head 167. The cross head 167 is provided with suitably threaded openings in its end bosses 168, 168, the said threaded openings receiving screws 169, 169 which are rotatably mounted in suitable bearings 170, 170, carried by end frames or brackets 171 of the mechanism unit 33. The screw posts 169 are each provided with an upwardly projecting extension on which is mounted a sprocket 169a for receiving a chain 169b. One of the screw posts 169 is equipped with a crank handle 172 to facilitate manual rotation of the screws 169 to thereby effect vertical adjustment of the sealer bars 162.

For locking the screw posts 169 against adjustment, a disengageable locking device may be provided. In this instance, such a device is shown in connection with the sprocket 169a at the right-hand side of the mechanism as shown in Figure 19. Said locking device comprises a pin 173 carried by a leaf spring 174 and having a portion adapted to project through an opening in a supporting plate 175 and into an opening in the hub portion of the sprocket 169a.

As best shown in Figure 20, the sealer bars 162 are provided with longitudinally toothed or corrugated marginal portions 176, 176, which are adapted to mesh with each other, suitable electrical heating units 177, controlled by thermostats 177a being also mounted on said sealer bars 166 and so arranged as to effect heating of said sealer bars 162, 162.

Rocking movement of the sealer bars 176, 176 downwardly and toward each other is effected in properly synchronized relation to the travel of the conveyor 39 by means of an arm 178 secured to an extended end portion of one of the shafts 165, which is pivotally connected at its free end to one end of a connecting rod 179. The other end of said connecting rod is pivotally connected to the free end of an arm 180 (Figure 1) of a bell crank which is pivotally mounted on a shaft 181 which is suitably journalled on the main frame structure. The last mentioned bell crank also includes an arm 182 which carries at its free end a roller 183 which engages a cam track 184 in a disc 185 carried by a shaft 186.

The shaft 186 is suitably journalled in bearing brackets carried by the main frame and it is driven by means of a gear connection 187 to a longitudinally extending shaft 188 which is also suitably journalled in frame-carried brackets, the other end of said shaft 188 being provided with a gear connection 189 with the main drive shaft 59 (see Figures 1 and 2).

The cam track 184 is so shaped that it will impart the proper amount of rocking movement to the shafts 165, 165 which are interconnected for simultaneous, upwardly directed rocking movement by means of intermeshing gears 190 on the ends of said shafts 165.

As shown in Figure 20 in broken lines, the sealer bars 162 are brought together in such a manner as to squeeze between them the upwardly projecting marginal portions 86 of the wrapper. It being understood that the wrapper embodies a coating or such treatment as would cause the adjacent faces thereof to be united when pressed together, it will be apparent that the sealer bars 162 will operate to unite the interposed marginal portions of the wrapper.

By way of example, it may be stated that such coatings as wax or mixtures of rubber or latex and wax and other more or less plastic or cementitious compounds would produce the desired moisture-proofing effects and may advantageously be employed in wrappers sealed in the manner explained. In some instances the employment of heat to more readily effect fusion of the coatings is desirable, and in such instances the described pinching-sealing action is highly effective. In other instances, however, it is preferable that heat be not employed since it has a tendency to cause or permit the moisture-proofing coating to run on the surface of the wrapper sheet which in some cases may result in leakage.

Where pressure alone is to be employed, the amount of pressure should usually be somewhat greater than that required where both heat and pressure are employed. In such a case, a squeezing roller arrangement adapted to move lengthwise along the marginal portions 86 to effect union thereof may be employed. Since the present invention is not concerned with the details of such pressure-roller sealing means, it is not herein illustrated or described in detail.

After the sealing mechanism comprised in unit 33 of the mechanism has completed its operation and released the united marginal portions 86, the package is again advanced. It is then first carried under a blower pipe 191 which is suitably vertically adjustably supported on the side frames of the mechanism as indicated in Figures 1 and 22. The blower pipe 191 is connected by means of a hose or conduit 192 to a source of compressed air and it is provided with a series of discharge holes 193 through which air is directed against the hot, sealed marginal portions 86. Such draft of air tends to cool and harden the fused coating so as to prevent shifting of the respective marginal portions relative to each other when said marginal portions are folded into flat position on the top of the package content.

The upstanding united marginal portions 86 are initially folded into flatwise position on the top of the package as an incident to the travel of the package under a presser head 194. The presser head 194 is normally held in such an elevation that it will clear the upper edge of the box 41 but nevertheless low enough to engage and fold rearwardly the said upstanding marginal portions 46. When the package comes to rest under said presser head 194, the latter is moved downwardly to complete the folding action and to more or less again press the top surface of the package into flat, finished condition preferably somewhat below the level of the top edges of the box 41.

The presser head 194 is accordingly made of such size and configuration that it may enter the box to the desired limited extent and it is carried by a pair of rods 195 which are detachably connected at their upper ends to a cross head 196. The cross head 196 has its opposite ends provided with suitably apertured boxes for slidably fitting on reduced diameter end portions 197 of actuating rods 198, the latter being vertically slidably mounted in bearing members 199. The end portions of the cross head 196 are normally urged to rest on shoulders 200 formed at the juncture of the reduced diameter post parts 197 and the main body of the posts 198, and coil springs 201 are provided for yieldingly maintaining the cross head in such position.

The bearing members 199 are pivotally mounted as indicated at 202 in upstanding bracket elements carried by the main frame structure so as to permit slight rocking movement of the posts 198 and parts carried thereby incident to the vertical actuation thereof.

The posts 198, 198 have their lower ends pivotally connected to the free ends of arms 203, 203 which are secured to a suitably journalled shaft 204. Rocking action is imparted to one of the arms 203 (and through the shaft 204 to the other arm 203) by means of a link 205 which is connected at one end to one of the arms 203 and at its other end to an arm 206 of a bell crank member which is fixedly mounted on the shaft 181. The other arm 207 of the bell crank member is provided with a roller 208 which engages a cam track 209 in a disc 210 which is carried by the driven shaft 186.

It will be seen that the cam 209 is operative through the aforesaid connections to effect vertical reciprocation of the posts 198 and the parts carried thereby, including the cross head 196 and pressing head 194. Downward movement of the presser head 194 is effected through the springs 197 so that the pressure on the package content is yieldingly applied and the application of excessive pressure prevented. Upward movement of the presser head is positively effected by engagement of the shoulders 200 with the end portions of the cross head 196.

To facilitate accurate adjustment of the extent of vertical movement imparted to the presser member 194, the pivotal connection between the lower end of the link 205 and the bell crank arm 206 is made adjustable. For this purpose the bell crank arm 206 has attached to it a plate 211, the said plate being bolted to a flange part 212 of the arm 206 as is best shown in Figures 23, 28 and 29. The plate 211 may be provided with elongated slots to permit longitudinal adjustment of the plate relative to the arm 206. The plate 211 has bolted to it an angle bracket 213 to which the lower end of the connecting rod or link 205 is pivoted. The bolted connection between the bracket 213 and plate 211 may also include slots in either the bracket 213 or plate 211 or both, to permit longitudinal adjustment of the bracket relative to the plate. Either of the described adjustable connections is sufficient for the purposes of the described apparatus and it will be apparent that by means of such adjustable connection the vertical throw imparted by the arm 206 to the link 205 may be adjusted to correspondingly adjust the vertical movement of the presser head 194. Further means for controlling such vertical movement may include the provision of extra holes 214 and 215 in the angle bracket 213 and arm 203, respectively, for changing the location of the pivotal connection between the ends of the link 205 and the respective parts.

When the package has been subjected to the operation of the presser 194, the sealed marginal portions 86 are folded to flatwise position on the surface of the package with the pointed end portions 87 projecting endwise in the plane of said top surface as indicated in broken lines in Figure 26. In the next unit of mechanism 36 the end portions 87 are subjected to means for sealing the same crosswise as indicated at 216 in Figure 26. To facilitate such sealing action, the end portions 87 of the wrapper are first turned or folded from their initial flatwise position to upstanding position as shown in full lines in Figure 26. For effecting such upward turning of the end portions 87, there are provided stationary guide members 217, 217 which have their receiving ends 218 bevelled or inclined so as to be adapted to receive the wrapper portions 87 thereabove. As an incident to the succeeding forward movement of the package, said wrapper end portions ride on the upper edges of said guides 217 which are appropriately formed and shaped to effect the desired upward folding of said wrapper end portions. The package is thus delivered with its wrapper end portions 87 extending upwardly to the mechanism unit 36. The upwardly extending wrapper portions 87 enter between the initially opened sealing jaws 219 and 220 which are respectively carried by arms 221 and 222. It will be understood that there is a pair of sealing jaws 219 and 220 for each end of the package. The arm 222 depends from a mounting bracket 223 comprising a pair of apertured hubs 224 and 225. The hub 224 is slidably mounted on a horizontal shaft 226 and the hub 225 is provided with suitable internal screw threading to engage the threaded portion 227 of another horizontal shaft 228. The shafts 226 and 228 have their ends mounted in brackets 229 which are supported for vertical adjustment by means of vertically disposed, rotatably mounted posts 230. Each of the posts 230 is provided with screw threading 231 for engaging corresponding threading in the brackets 229 so that upon rotation of said posts, the brackets 229 will be correspondingly vertically adjusted.

The posts 230 may be journalled in suitable bearings and anchored against vertical movement in any suitable manner, for example, as shown in Figure 29, and they are preferably interconnected for simultaneous rotation by means of a chain 232 which engages sprockets carried by the upper end portions of the respective shafts or posts 230. One of the sprockets may be provided with a crank handle 233 to facilitate turning of such sprocket and associated post and a suitable disengageable locking device such as indicated at 234 may be provided in association with the same or the other sprocket for locking the posts in selected position of adjustment.

The jaw-carrying arm 221 is pivotally mounted as indicated at 235 on the bracket 223 and said arm is provided with a pair of ears 236 between which there is pivotally connected to said ears a member 237. The member 237 is slidably mounted on the upper end portion 238 of a post 239, said upper end portion being of reduced diameter so as to provide a stop shoulder 239a (see Figure 25) for limiting the movement of the mounting member 237 downwardly on the post. A suitable coil spring 240 is provided on the end portion of the post to normally urge and hold the member 237 to its seat against the stop shoulder 239a.

The lower end of the post or rod 239 for each pair of sealing jaws 219 and 220 is pivotally connected at its lower end by means of a universal joint 241 to an actuating arm (see Figures 28 and 29) carried by the rock shaft 181 which is rocked, as already described, by means of the cam 209. One of the rods 239 is connected to an extension of the bell crank arm 206 and the other rod 239 is connected to an arm 206a which corresponds to the extended bell crank arm 206 and is rigidly connected at its other end to the said rock shaft 181.

It will be understood that, incident to the rocking movement of the shaft 181 under the influence of the cam 209, the outer jaws 219 of each pair of end sealer jaws will be rocked on their pivotal mountings 235 to open and close said jaws. The jaws may be provided with electrical heating elements as indicated at 242 if it is desired to employ heat in addition to pressure in effecting the sealing action on the package end portions. Said jaws may be of more or less interfitting corrugated form as best shown in Figure 25 (as is also the case with the sealing jaws 162, 162) for more effectively producing the desired seal. It will be further observed that the sealing pressure is transmitted to the jaws through the agency of the springs 240 on the upper ends of the posts 239. The pressure may thus be more or less controlled by varying the springs 240 to provide the desired amount of resiliency or by adjusting the stop nuts on the upper ends of the posts 239 to adjust the compression of the springs.

After the end sealing mechanism 36 has completed its operation and released the package, the package is again advanced and is carried to suitable mechanism for applying and securing a top to the outer box 41 or for closing a foldable cover thereon in the event that a paper box with a foldable cover is employed. However, as a preliminary to the closing of the outer container 41, suitable guide means similar to the folding guides 217 may be employed for folding the upstanding sealed ears 87, 87 inwardly into flatwise position on the top of the package content. Such folding device may be located at any convenient point in the path of travel of the packages and are not herein shown.

For the purpose of adapting the mechanism to operation on packages of various sizes, various adjustable arrangements are provided. The conveyor chains 39 are preferably so spaced that they will accommodate any of the various sizes of packages contemplated without changing any of the spacing of the same. However, the side guides 40, 40 may be adjusted laterally by the simple expedient of providing detachable mountings for the guide-supporting brackets 243 on the supporting cross members 244 and by providing various positions in which the brackets may be secured to said supporting member. Obviously, if desired, the brackets 243 may be adjustably mounted by means of bolt and slot connections to the member 244 if preferred.

To accommodate the presser mechanism of the unit 31 to different sizes of packages, the presser head 46 is provided with the vertical adjustment already described in respect of the cross head 48. To accommodate such adjustment, the connecting rod or link 52 is made with an adjustable connection between its ends and the respective forked members carried thereby as is clearly shown. Furthermore, the presser head 46 is detachably connected and adapted to be replaced by a different size of head incident to the described removable mounting of the head 46 in the mounting member 68. The operative position of the fingers 63 may be varied by suitably slidably adjustably mounting the parts 61 on the brackets 60, and the brackets 60 on the bearing members 50, but for practical purposes it is preferred that any adjustment desired be effected by replacing the brackets 60 with other brackets of proper proportions to suitably position the fingers 63.

In respect of the mechanism unit 32, the position of the centering plates 107, 111 and 111 and oher parts carried by the brackets 108, 108 may be adjusted by suitably adjusting the length of the connecting link 124 which is made of adjustable length as clearly shown in Figure 7. For practical purposes the throw or extent of movement of said members need not be varied. The vertical position of said parts may be adjusted by suitably adjusting the length of the links 94 which are made adjustable as clearly shown. The links 119 and 149 are also made adjustable so as to permit adjustment of the length thereof to accommodate or compensate for any change in the length of the links 94.

In respect of the mechanism unit 33, the only adjustment required is a vertical adjustment and the same is provided incident to the screw post mounting 169 whereby the elevation of the sealer bars 162 may be adjusted to suit.

The air pipe 191 may be adjusted vertically by the simple expedient of vertically adjustably mounting the brackets which support said pipe as is clearly shown in Figure 22.

Vertical adjustment of the fold-pressing head 194 in the mechanism unit 35 may be effected by the simple expedient of substituting different lengths of posts 195 to secure the desired elevation of the presser head 194. However, said elevation may also be adjusted by adjusting the lengths of the posts 198, 198 which, as shown in Figure 23, are provided with adjustable connections between their lower ends and the clevises, whereby said posts are connected to the arms 203.

In respect of the mechanism unit 36, said mechanism is vertically adjustable incident to the screw post mounting 231 already described. For accommodating the connections between the movable jaws 219 and the members 237 to various positions of vertical adjustment of the sealing jaws, said members 237 are provided with a series of openings respectively adapted to receive the pivot pin which connects said members to the respective arms 236 of said pivoted jaw members. Additional adjustment may be provided if required incident to the adjustable connection between the lower ends of the posts 239 and the universal joints 241 as illustrated in Figure 29.

For the purpose of effecting adjustment of the relative horizontal positions of the sealer jaws 219 and 220, the same are slidably mounted on said shaft 226 and provided with the described screw-threaded connection with the threaded sections 227 of the shaft 228. Said shaft 228 is rotatably mounted adjacent its ends in the end brackets 229 and one end of said shaft 228 is extended and provided with a crank handle 245 to facilitate manual rotation of the shaft 228 with incident horizontal adjustment of the mounting brackets 223 toward or from each other.

For locking the sealing members in fixed position of horizontal adjustment, the shaft 228 is provided with a radially slotted wheel 246 suitably non-rotatably secured thereto, the slots thereof being adapted to receive a locking bar 247 which is pivotally secured at one end to an ear 248 extending from one of the members 223.

In the mechanism as described, various mechanical operations on the package have been separated into different units of mechanism for the purpose of simplification of mechanical structure and facilitating adjustment and repair, should the same be required. It may be observed, however, that the mechanism embodied in units 32 and 33 of the apparatus as described may readily be combined into a single unit of mechanism if desired, since these units operate in like directions with respect to the wrapper parts affected thereby. Other changes in mechanical construction and details may also be made without departing from the spirit of the invention, the scope of which should be determined by reference to the following claims, the same being construed as broadly as possible consistent with the state of the art.

I claim:

1. In apparatus for closing filled packages having side wall portions extending upwardly beyond the top surface of the package content, means for effecting distension of the upwardly extending wall portions of the wrapper substantially into continuations of the planes of the walls from which said portions extend, means adapted to enter within the distended wall portions and to act against the inside thereof to effect folding of certain of said upstanding portions inwardly over the area of the package.

2. Apparatus according to claim 9 wherein said fingers are carried by laterally movable means and wherein there is provided movable means actuated by said carrying means for controlling the rocking movement of said fingers.

3. In apparatus for closing filled packages having side wall portions extending upwardly beyond the level of the package content, the combination of a presser head adapted to enter the receptacle to press the top surface of the content of the receptacle, and means for distending said upwardly extending side wall portions to facilitate entrance of said presser head, said means comprising a finger associated with each corner of the receptacle and adapted to enter the same in inwardly spaced relation to the normal line of the corner, and means for effecting outwardly directed movement of the finger to engage the corner portions of the receptacle.

4. In apparatus for closing filled packages having side wall portions extending upwardly beyond the level of the package content, the combination of a presser head adapted to enter the receptacle to press the top surface of the content of the receptacle, and means for distending said upwardly extending side wall portions to facilitate entrance of said presser head, said means comprising a finger associated with each corner of the receptacle and adapted to enter the same in inwardly spaced relation to the normal line of the corner, and spring means for effecting outwardly directed movement of the finger to engage the corner portions of the receptacle.

5. In apparatus for closing filled packages having side wall portions extending upwardly beyond the level of the package content, the combination of a presser head adapted to enter the receptacle to press the top surface of the content of the receptacle, means for distending said upwardly extending side wall portions to facilitate entrance of said presser head, said means comprising a finger associated with each corner of the receptacle and adapted to enter the same in inwardly spaced relation to the normal line of the corner, spring means for effecting outwardly directed movement of the finger to engage the corner portions of the receptacle, and interengaging means connected with said presser head and finger for controlling the operation of said fingers.

6. In apparatus for closing filled packages having side wall portions extending upwardly beyond the level of the package content, the combination of a pair of plate members adapted to be inserted into the receptacle, means for effecting simultaneous, edgewise outward movement of said plate members transversely of the ends of the package, means carried by each of said plates for engaging the upstanding end portions of the liner to effect outward folding of said end portions and operative incidentally to effect inward folding of the upstanding side portions of the receptacle so as to cause marginal portions thereof to engage said plates to be thereby retained in upstanding position, means cooperating with said plates for forming a relatively sharp fold between said marginal portions and the inwardly folded wall from which they extend, means for effecting withdrawal of said plate members from between said marginal portions, and means for uniting said upstanding marginal portions.

7. In apparatus for closing filled packages having side wall portions extending upwardly beyond the level of the package content, the combination of a pair of plate members adapted to be inserted into the receptacle, means for effecting simultaneous, edgewise outward movement of said plate members transversely of the ends of the package, means carried by each of said plates for engaging the upstanding end portions of the liner to effect outward folding of said end portions and operative incidentally to effect inward folding of the upstanding side portions of the receptacle so as to cause marginal portions thereof to engage said plates to be thereby retained in upstanding position, means cooperating with said plates for forming a relatively sharp fold between said marginal portions and the inwardly folded wall from which they extend, means for effecting withdrawal of said plate members from between said marginal portions, means for uniting said upstanding marginal portions, means for folding said united upstanding marginal portions into flatwise position on the top of the package, and means for folding said outwardly folded end portions into inwardly extending position overlying the top of the package.

8. In apparatus for sealing folds of a wrapper at the ends of a package, the combination of a pair of sealing jaws associated with each end of the package, vertically movable means for actuating said jaws, means for horizontally adjustably mounting said jaws, and means for effecting simultaneous adjustment of said jaws in opposite directions for adapting the apparatus to operation on different sizes of packages.

9. In apparatus for closing filled packages having side wall portions extending upwardly beyond the top surface of the package content, the combination of a pair of fingers, means for moving said fingers into position adjacent and substantially parallel to the top of the package content and within said upstanding side wall portions, means for moving said fingers laterally outwardly so as to effect outward folding of one upstanding wall portion substantially into the plane of the top of said content and incidentally thereto, inward folding of oppositely disposed intervening wall portions, and means operative during said laterally outward movement of said fingers for rocking the same toward parallel relation to each other to facilitate withdrawal thereof from within said folded wall portions by continued lateral outward movement of said fingers.

10. Apparatus according to claim 9 wherein the fingers initially enter the package in transversely extending relation to the wall portion which is to be folded outwardly, and wherein there is provided means for rocking said fingers into parallel relation to said wall portion preliminarily to effecting outward folding thereof.

11. Apparatus according to claim 9 wherein the fingers initially enter the package in transversely extending relation to the wall portion which is to be folded outwardly, and wherein there is provided movable means for rocking said fingers into parallel relation to said wall portion preliminarily to effecting outward folding thereof.

12. Apparatus according to claim 9 wherein there are provided spring means tending to maintain said fingers in substantially aligned relation parallel to the wall portion to be folded upwardly, movable means for initially holding said fingers in collapsed position extending transversely of said wall portion to thereby facilitate movement of the fingers into the receptacle, and stationary cam means for rocking said fingers into said parallel relation to each other as an incident to the lateral outward movement thereof.

13. In apparatus for closing filled packages having side wall portions extending upwardly beyond the top surface of the package content, the combination of a pair of vertically disposed plate members movable vertically into position within said upstanding wall portions of the package, means for effecting simultaneous oppositely outwardly directed movement of said plate members, and means carried by said plate members for engaging and effecting outward folding of an opposed pair of said upstanding wall portions, folding of said outwardly folded portions upon themselves, and, as an incident thereto, inward folding of the intervening opposed pair of said upstanding wall portions.

14. In apparatus for closing filled packages having side wall portions extending upwardly beyond the top surface of the package content, the combination of a pair of vertically disposed plate members movable vertically into position within said upstanding wall portions of the package, means for effecting simultaneous oppositely outwardly directed movement of said plate members for effecting outward folding of an opposed pair of said upstanding wall portions and, as an incident thereto, inward folding of another opposed pair of said upstanding wall portions, said outwardly folded portions being also thereby incidentally folded upon themselves, and means carried by said plate members for guiding said incidental folding of said outwardly folded pair of wall portions.

15. In apparatus for closing filled packages having side wall portions extending upwardly beyond the top surface of the package content, the combination of a pair of vertically disposed plate members movable vertically into position within said upstanding wall portions of the package, means for effecting simultaneous oppositely outwardly directed movement of said plate members for effecting outward folding of an opposed pair of said upstanding wall portions and, as an incident thereto, inward folding of another opposed pair of said upstanding wall portions, said outwardly folded portions being also thereby incidentally folded upon themselves, means cooperating with said plate members for guiding said incidental folding of said outwardly folded pair of wall portions, said inwardly folded wall portions being of such width that marginal edge portions thereof engage said plates to be thereby retained in an upwardly extending position, means for tucking said inwardly folded wall portions into contact with the underlying surface of the package content, means for effecting withdrawal of said plates from between said upstanding marginal portions, and means for uniting said marginal portions.

16. In apparatus for closing filled packages having side wall portions extending upwardly beyond the top surface of the package content, the combination of a pair of vertically disposed plate members movable vertically into position within said upstanding wall portions of the package, means for effecting simultaneous oppositely outwardly directed movement of said plate members for effecting outward folding of an opposed pair of said upstanding wall portions and, as an incident thereto, inward folding of another opposed pair of said upstanding wall portions, said outwardly folded portions being also thereby incidentally folded upon themselves, means cooperating with said plate members for guiding said incidental folding of said outwardly folded pair of wall portions, said inwardly folded wall portions being of such width that marginal edge portions thereof engage said plates to be thereby retained in upwardly extending position, means acting on said inwardly folded portions while the marginal edge portions thereof are engaged with said plates to form relatively sharp folds between said marginal portions and the respective inwardly folded wall portions, means for effecting withdrawal of said plates from between said upstanding marginal portions and means for uniting said marginal portions.

17. In apparatus for closing filled packages having side wall portions extending upwardly beyond the top surface of the package content, the combination of a pivotally mounted pair of fingers which are also mounted independently of their pivotal mounting for vertical and lateral movement, means for moving said fingers vertically into position adjacent and substantially parallel to the top of the package content and within said upstanding side wall portions, means for moving said fingers laterally outwardly so as to effect outward folding of one opposed pair of upstanding wall portions substantially into the plane of the top of said content and incidentally thereto, inward folding of the oppositely disposed intervening pair of wall portions, said outwardly folded portions being thereby also incidentally folded diagonally upon themselves about said fingers, said fingers, when initially engaging the wall portion folded outwardly thereby, being in substantially longitudinally aligned relationship and substantially parallel to the engaged upstanding wall portions, means for rocking said fingers on their respective pivot mountings into substantially parallel side by side relation as the lateral movement thereof progresses, thereby facilitating movement of said fingers outwardly from between the ends of the folds formed around said fingers.

18. In apparatus for closing filled packages embodying a receptacle having four side wall portions extending upwardly beyond the top surface of the package content, means acting against the inside of one oppositely disposed pair of upstanding wall portions for folding the same outwardly substantially into the plane of the top of the package content, the remaining oppositely disposed pair of upstanding wall portions being thereby incidentally folded inwardly over the top surface of said package content, said inwardly folded portions being of such width as to cause marginal portions thereof to remain in upstanding substantially face to face position intermediate opposite sides of the package, tuckers movable inwardly over said inwardly folded portions in engagement therewith to stretch the same into smooth condition on said top surface of the package content, means mounting said tuckers for rocking movement independently of said inward movement thereof, and means carried by said tuckers for engaging the outside of the package to effect rocking of said tuckers toward said top surface of the package content at the inner limit of movement of said tuckers.

19. In apparatus for closing filled packages embodying a receptacle having opposed edge and opposed side wall projections which extend upwardly from the normal top level of the package a distance which is greater than one-half of the width of the package between its side walls, edgewise expansible plate means insertable into said receptacle within the confines of said projections for effecting outward folding of said edge wall projections and inward folding of said side wall projections, marginal strips of said inwardly folded projections being thereby caused to engage said plates so as to be thereby supported in upstanding position, and means co-operating with said plates to form sharp folds between said marginal strips and the inwardly folded projections from which the respective marginal strips extend.

20. In apparatus for closing filled rectangular packages having opposed edge and opposed side wall portions extending upwardly beyond the level of the package content, the combination of means for supporting the opposite edges of the package substantially at the level of the package end to be closed, and outwardly movable means engageable with the inner faces of each of said upwardly extending edge wall portions across substantially its entire width for folding said edge wall portions outwardly over said edge supporting means, thereby to incidentally effect inward folding of said oppositely disposed side wall portions to close the package.

21. In apparatus for closing a filled package comprising a receptacle having oppositely disposed edge and oppositely disposed side wall portions which extend upwardly from the top surface of the package content, means for folding said edge wall portions outwardly and said side wall portions inwardly, said outwardly folded portions being also incidentally folded upon themselves in continuation of the lines on which said side wall portions are folded inwardly, whereby said outwardly folded portions embody mutually overlapping sections, and means engaging the opposite faces of said oppositely folded edge wall portions for clamping and sealing together mutually overlapping sections thereof.

22. In apparatus for closing a filled package comprising a receptacle having oppositely disposed edge and oppositely disposed side wall portions which extend upwardly from the top surface of the package content, means for folding said edge wall portions outwardly and said side wall portions inwardly, said outwardly folded portions being also incidentally folded upon themselves in continuation of the lines on which said side wall portions are folded inwardly, whereby said outwardly folded portions embody mutually overlapping sections, and means for clamping and sealing said mutually overlapping sections of said outwardly folded portions together in zones extending transversely thereof adjacent the lines of fold on which said edge wall portions are respectively folded outwardly, said last mentioned means embodying pairs of co-operating pressure members adapted to receive between them the said zones of said outwardly folded edge wall portions.

23. In apparatus for closing a filled package comprising a receptacle having oppositely disposed edge and oppositely disposed side wall portions which project upwardly from the top surface of the package content, the extent of said upward projection being more than one-half the dimension of the package between said oppositely disposed side wall projections, means for folding said edge wall projections outwardly and said side wall projections inwardly to thereby bring marginal portions of said side wall projections into upstanding interengaging position adjacent the longitudinal center of the top of the package, said outwardly folded portions being also incidentally folded upon themselves in continuation of the lines on which said side wall portions are folded inwardly, whereby said outwardly folded portions embody mutually overlapping sections, means for sealing together said interengaging margins, and means engageable with the opposite faces of said outwardly folded edge wall portions for clamping and sealing together the mutually overlapping sections thereof.

24. In apparatus for closing a filled package embodying a receptacle having oppositely disposed edge and oppositely disposed side wall portions which project upwardly from the level of the top of the package content, the extent of said upward projection being more than one-half the dimension of the package between said oppositely disposed side wall projections, the combination of means for effecting outward folding of said upwardly extending edge wall projections and inward folding of said side wall projections, said outwardly folded portions being folded upon themselves as an incident to the inward folding of said side wall projections so as to embody mutually overlapping sections, and marginal portions of said inwardly folded side wall projections together with portions of said outwardly folded edge wall projections constituting endwise extensions of said marginal portions being brought into interengaging position extending upwardly from the inwardly folded portions intermediate the opposite sides of the receptacle, pressure means for sealing together said upwardly extending marginal portions including said endwise extensions thereof, and means for clamping and sealing said mutually overlapping sections of said outwardly folded portions together in zones extending transversely thereof and adjacent the lines of fold on which said edge wall portions are respectively folded outwardly, said last mentioned means embodying pairs of cooperating pressure members adapted to receive between them said transversely extending zones of said outwardly folded portions.

FRANK D. PALMER.